US012706994B2

(12) United States Patent
Bae et al.

(10) Patent No.: US 12,706,994 B2
(45) Date of Patent: Aug. 11, 2026

(54) ELECTRONIC DEVICE FOR CONTROLLING EXECUTION OF SOFTWARE APPLICATION BASED ON STATE AND METHOD THEREOF

(71) Applicant: Samsung Electronics Co., Ltd., Suwon-si (KR)

(72) Inventors: Hyerim Bae, Suwon-si (KR); Jihea Park, Suwon-si (KR); Huijong Shin, Suwon-si (KR); Seho Chang, Suwon-si (KR); Jinwook Chun, Suwon-si (KR); Wonsun Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 112 days.

(21) Appl. No.: 18/747,170

(22) Filed: Jun. 18, 2024

(65) Prior Publication Data

US 2025/0055932 A1 Feb. 13, 2025

Related U.S. Application Data

(63) Continuation of application No. PCT/KR2024/007388, filed on May 30, 2024.

(30) Foreign Application Priority Data

Aug. 13, 2023 (KR) ........................ 10-2023-0105976
Sep. 19, 2023 (KR) ........................ 10-2023-0125148

(51) Int. Cl.
*H04M 1/02* (2006.01)

(52) U.S. Cl.
CPC ....... *H04M 1/0243* (2013.01); *H04M 1/0268* (2013.01); *H04M 1/0222* (2013.01)

(58) Field of Classification Search
None
See application file for complete search history.

(56) References Cited

U.S. PATENT DOCUMENTS 11,552,264 B2 1/2023 Kim et al.
11,567,532 B2 1/2023 Jung et al.
(Continued)

FOREIGN PATENT DOCUMENTS

CN 103370924 A 10/2013
CN 103914205 A * 7/2014 ........... G06F 16/168
(Continued)

OTHER PUBLICATIONS

Search Report and Written Opinion dated Sep. 30, 2024 issued in International Patent Application No. PCT/KR2024/007388.

*Primary Examiner* — Zhengxi Liu
(74) *Attorney, Agent, or Firm* — Nixon & Vanderhye P.C.

(57) ABSTRACT

At least one processor, comprising processing circuitry, of an electronic device according to an example embodiment is, individually and/or collectively, configured to execute one or more applications on a cover display in a folded state of the electronic device; control the electronic device to display, in response to switching of the electronic device from the folded state to a half-folded state of the electronic device based on rotation of the first housing, a list of the one or more applications executed on the cover display on a first displaying region of a flexible display; and control the electronic device to display, in response to switching of the electronic device from the half-folded state to an unfolded state based on rotation of a third housing, a screen associated with at least one of the one or more applications on the flexible display.

20 Claims, 17 Drawing Sheets

(56) References Cited

U.S. PATENT DOCUMENTS

| | | | |
|---|---|---|---|
| 11,662,770 B2 | 5/2023 | Lee et al. | |
| 11,735,143 B2 | 8/2023 | Cho et al. | |
| 11,940,850 B2 | 3/2024 | Han et al. | |
| 12,099,708 B2 | 9/2024 | Chung et al. | |
| 2010/0146016 A1* | 6/2010 | Moondra | G06F 16/164 707/812 |
| 2014/0310643 A1 | 10/2014 | Karmanenko et al. | |
| 2021/0056878 A1 | 2/2021 | Lee et al. | |
| 2021/0173438 A1* | 6/2021 | Lee | G06F 1/1681 |
| 2021/0247805 A1* | 8/2021 | Min | G06F 9/4843 |
| 2023/0044526 A1 | 2/2023 | Kwon et al. | |
| 2023/0080358 A1* | 3/2023 | Han | G06F 1/1615 345/173 |
| 2023/0130530 A1 | 4/2023 | Park et al. | |
| 2023/0176721 A1* | 6/2023 | Chung | G06F 16/18 345/173 |
| 2023/0185508 A1 | 6/2023 | Chung et al. | |
| 2023/0214103 A1 | 7/2023 | Kim et al. | |
| 2023/0239391 A1 | 7/2023 | Zhou et al. | |
| 2024/0073314 A1 | 2/2024 | Kim et al. | |
| 2024/0152307 A1 | 5/2024 | Han et al. | |

FOREIGN PATENT DOCUMENTS

| | | | | |
|---|---|---|---|---|
| JP | 2010064404 A | 3/2010 | | |
| KR | 10-2020-0119020 | 10/2020 | | |
| KR | 10-2021-0021896 | 3/2021 | | |
| KR | 20210021863 A | 3/2021 | | |
| KR | 10-2021-0044975 | 4/2021 | | |
| KR | 10-2021-0117605 | 9/2021 | | |
| KR | 20210144461 A | 11/2021 | | |
| KR | 20220000729 A | 1/2022 | | |
| KR | 10-2022-0015266 | 2/2022 | | |
| KR | 20220015266 A | * | 2/2022 | G06F 3/0488 |
| KR | 20220017244 A | 2/2022 | | |
| KR | 10-2022-0033262 | 3/2022 | | |
| KR | 10-2022-0088603 | 6/2022 | | |
| KR | 20230012850 A | 1/2023 | | |
| KR | 20230018669 A | 2/2023 | | |
| WO | 2021209047 A1 | 10/2021 | | |
| WO | WO-2023237016 A1 | * | 12/2023 | G06F 3/04886 |

* cited by examiner

ELECTRONIC DEVICE FOR CONTROLLING EXECUTION OF SOFTWARE APPLICATION BASED ON STATE AND METHOD THEREOF

CROSS-REFERENCE TO RELATED APPLICATIONS

This application is a continuation of International Application No. PCT/KR2024/007388 designating the United States, filed on May 30, 2024, in the Korean Intellectual Property Receiving Office and claiming priority to Korean Patent Application Nos. 10-2023-0105976, filed on Aug. 13, 2023, and 10-2023-0125148, filed on Sep. 19, 2023, in the Korean Intellectual Property Office, the disclosures of each of which are incorporated by reference herein in their entireties.

BACKGROUND

Field

The present disclosure relates to an electronic device for controlling execution of a software application based on a state and a method thereof.

Description of Related Art

A shape and/or size of an electronic device are diversifying. To enhance mobility, an electronic device with reduced size and/or reduced volume are being designed. The electronic device may include a display for visualizing information. As the number of functions supported by the electronic device increases, the size of the display may increase to visualize more information to a user and/or to support execution of the functions. For example, it may be designed to maintain or increase the size of the display while reducing the size and/or volume of the electronic device.

The above-described information may be provided as a related art for the purpose of helping to understand the present disclosure. No claim or determination is raised as to whether any of the above-described information may be applied as a prior art related to the present disclosure.

SUMMARY

According to an example embodiment, a foldable electronic device may comprise: a housing including a first housing part, a second housing part rotatably coupled to the first housing part, and a third housing part rotatably coupled to the second housing part, a flexible display including a first display area disposed on the first housing part, a second display area disposed on the second housing part, and a third display area disposed on the third housing part, at least one sensor configured to sense a first angle between the first housing part and the second housing part, and a second angle between the second housing part and the third housing part, at least one processor comprising processing circuitry, and memory, comprising one or more storage media, storing instructions. The instructions, when executed by at least one processor, individually or collectively, cause the foldable electronic device to display, in response to detecting changing from a multi-folded state to a single-folded state, on the first display area, one or more visual objects respectively corresponding to one or more software applications to be executed in an unfolded state. The instructions, when executed by at least one processor individually or collectively, cause the foldable electronic device to receive, while displaying the one or more visual objects on the first display area, an input to select at least one visual object among the one or more visual objects. The instructions, when executed by at least one processor individually or collectively, cause the foldable electronic device to display, based on the received input, on the first, the second, or the third display area, at least one execution screen corresponding to the at least one visual object selected by the input based on a state of the foldable electronic device being changed from the single-folded state to the unfolded state.

According to an example embodiment, a method of a foldable electronic device may be provided. The foldable electronic device may comprise a housing including a first housing part, a second housing part rotatably coupled to the first housing part, and a third housing part rotatably coupled to the second housing part, a flexible display including a first display area disposed on the first housing part, a second display area disposed on the second housing part, and a third display area disposed on the third housing part, at least one sensor configured to sense an angle between the first housing part and the second housing part, and an angle between the second housing part and the third housing part. The method may comprise displaying, in response to detecting changing, from a multi-folded state to a single-folded state, on the first display area, one or more visual objects respectively corresponding to one or more software applications to be executed in an unfolded state. The method may comprise receiving, while displaying the one or more visual objects on the first display area, an input to select at least one visual object among the one or more visual objects. The method may comprise displaying, based on the received input, on the first, the second, or the third display areas, at least one execution screen corresponding to the at least one visual object selected by the input based on a state of the foldable electronic device being changed from the single-folded state to the unfolded state.

According to an example embodiment, a non-transitory computer-readable storage medium storing instructions may be provided. The instructions may be executed by a foldable electronic device comprising a housing including a first housing part, a second housing part rotatably coupled to the first housing part, and a third housing part rotatably coupled to the second housing part, a flexible display including a first display area disposed on the first housing part, a second display area disposed on the second housing part, and a third display area disposed on the third housing part, at least one sensor configured to sense an angle between the first housing part and the second housing part, and an angle between the second housing part and the third housing part. The instructions may, when executed by at least one processor, comprising processing circuitry, individually and/or collectively, of the foldable electronic device, cause the foldable electronic device to: display, in response to detecting changing, from a multi-folded state in which the second display area is covered by the third display area and the first display area face a rear side of the third housing part, to a single-folded state in which the second display area is covered by the third display area and the first display area is in a same horizontal plane with the second display area, on the first display area, one or more visual objects respectively corresponding to a first set of one or more software applications to be executed in an unfolded state in which the first, the second, and the third display areas are in a same horizontal plane. The instructions may, when executed by the foldable electronic device, cause the foldable electronic device to display, in response to detecting changing from the unfolded state to the single-folded state, on the first display area, other visual objects respectively corresponding to a second set of one or more software applications to be executed in the multi-folded state.

An electronic device according to an example embodiment may comprise a first housing, a second housing rotatably coupled to the first housing, a third housing rotatably coupled to the second housing, a cover display positioned on a first surface of the first housing, a flexible display including a first displaying region positioned on a second surface of the first housing opposite to the first surface and a second displaying region positioned on a third surface of the second housing and a third displaying region positioned on a fourth surface of the third housing, a first sensor configured to detect an angle between the first housing and the second housing, a second sensor configured to detect an angle between the second housing and the third housing, memory for storing instructions, and at least one processor comprising processing circuitry configured to execute the instructions. At least one processor, individually and/or collectively, may be configured to: execute one or more applications on the cover display by the electronic device in a folded state. At least one processor, individually and/or collectively, may be configured to; control the electronic device to display, in response to switching of the electronic device from the folded state to a half-folded state based on rotation of the first housing, a list of the one or more applications executed in the cover display of the first housing, on the first displaying region. At least one processor, individually and/or collectively, may be configured to display, in response to switching of the electronic device from the half-folded state to an unfolded state based on rotation of the third housing, a screen associated with the at least one of the one or more applications on the flexible display.

A method of an electronic device according to an example embodiment may comprise executing, in a folded state of the electronic device, one or more applications on a cover display positioned on a first surface of the first housing. The method may comprise displaying, in response to switching of the electronic device from the folded state to a half-folded state based on rotation of the first housing, a list of the one or more applications executed on the cover display on a first displaying region of a flexible display of the electronic device positioned on a second surface of the first housing opposite to the first surface. The method may comprise displaying, in response to switching of the electronic device from the half-folded state to an unfolded state based on rotation of the third housing, a screen associated with at least one of the one or more applications provided by the list on the flexible display positioned on the second surface, a third surface of the second housing, and a fourth surface of the third housing.

An electronic device according to an example embodiment may comprise: a first housing, a second housing rotatably coupled to the first housing, a third housing rotatably coupled to the second housing, a cover display positioned on a first surface of the first housing, a flexible display positioned on a second surface of the first housing opposite to the first surface and a third surface of the second housing and a fourth surface of the third housing, one or more sensors, memory for storing instructions, and at least one processor, comprising processing circuitry, individually and/or collectively, configured to execute the instructions. At least one processor, individually and/or collectively, may be configured to: execute, in an unfolded state of the electronic device distinguished by a posture of the first housing, the second housing, and the third housing and verified by the one or more sensors, one or more software applications based on the flexible display. At least one processor, individually and/or collectively, may be configured to provide, in response to switching from the unfolded state to a sub-folded state of the electronic device based on rotation of the third housing, a list of the one or more software applications on the flexible display positioned on the second surface of the first housing. At least one processor, individually and/or collectively, may be configured to control the electronic device to display, in response to switching from the sub-folded state to a folded state of the electronic device based on rotation of the first housing, a screen associated with the one or more software applications provided by the list on the cover display.

A method of an electronic device according to an example embodiment may comprise executing, in an unfolded state of the electronic device distinguished by a posture of a first housing, a second housing and a third housing of the electronic device and verified by one or more sensors of the electronic device, one or more software applications based on a flexible display of the electronic device. The method may comprise providing, in response to switching from the unfolded state to a sub-folded state of the electronic device based on rotation of the third housing, a list of the one or more software applications on the flexible display among a cover display positioned on a first surface of the first housing, and the flexible display positioned on a second surface of the first housing opposite to the first surface, a third surface of the second housing, and a fourth surface of the third housing. The method may comprise displaying, in response to switching from the sub-folded state to a folded state of the electronic device based on rotation of the first housing, a screen associated with the one or more software applications provided by the list on the cover display.

An electronic device according to an example embodiment may comprise: a first housing, a second housing rotatably coupled to the first housing, a third housing rotatably coupled to the second housing, a flexible display positioned on a first surface of the first housing, a second surface of the second housing, and a third surface of the third housing, one or more sensors, memory for storing instructions, and at least one processor, comprising processing circuitry, individually and/or collectively, configured to execute the instructions. At least one processor, individually and/or collectively, may be configured to: execute, while a first portion of the flexible display positioned on the first surface is visible to the outside, and a second portion of the flexible display positioned on the second surface faces a third portion of the flexible display positioned on the third surface based on a folded state, one or more software applications based on the first portion. At least one processor, individually and/or collectively, may be configured to provide, in response to switching from the folded state to a sub-folded state of the electronic device based on rotation of the first housing, a list of the one or more software applications on the first surface. At least one processor, individually and/or collectively, may be configured to control the electronic device to display, in response to switching from the sub-folded state to an unfolded state of the electronic device based on rotation of the second housing, a screen associated with the one or more software applications provided by the list in entire active region of the flexible display including the first surface.

A method of an electronic device according to an example embodiment may comprise: executing, while a first portion of a flexible display positioned on a first surface of a first housing of the electronic device is visible to the outside, and a second portion of the flexible display positioned on a second surface of a second housing faces a third portion of the flexible display positioned on a third surface of a third housing based on a folded state of the electronic device, one or more software applications based on the first portion. The method may comprise providing, in response to switching from the folded state to a sub-folded state of the electronic device based on rotation of the first housing, a list of the one or more software applications on the first surface. The method may comprise displaying, in response to switching from the sub-folded state to an unfolded state of the electronic device based on rotation of the second housing, a screen associated with the one or more software applications provided by the list in entire active region of the flexible display including the first surface.

An electronic device according to an example embodiment may comprise: a first housing, a second housing rotatably coupled to the first housing, a third housing rotatably coupled to the second housing, a flexible display positioned on a first surface of the first housing, a second surface of the second housing, and a third surface of the third housing, one or more sensors, memory for storing instructions, and at least one processor, comprising processing circuitry, individually and/or collectively configured to execute the instructions. At least one processor, individually and/or collectively, may be configured to: execute, in an unfolded state of the electronic device, one or more software applications based on entire active region of the flexible display. At least one processor, individually and/or collectively, may be configured to provide, in response to switching from the unfolded state to a sub-folded state of the electronic device based on rotation of the third housing, a list of the one or more software applications on a portion of the flexible display positioned on the first surface. At least one processor, individually and/or collectively, may be configured to control the electronic device to display, in response to switching from the sub-folded state to a folded state of the electronic device based on rotation of the first housing, a screen associated with the one or more software applications provided by the list on the portion of the flexible display.

A method of an electronic device according to an example embodiment may comprise executing, in an unfolded state of the electronic device, one or more software applications based on entire active region of a flexible display positioned on a first surface of a first housing, a second surface of a second housing, and a third surface of a third housing of the electronic device. The method may comprise providing, in response to switching from the unfolded state to a sub-folded state of the electronic device based on rotation of the third housing, a list of the one or more software applications on a portion of the flexible display positioned on the first surface. The method may comprise displaying, in response to switching from the sub-folded state to a folded state of the electronic device based on rotation of the first housing, a screen associated with the one or more software applications provided by the list on the portion of the flexible display.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the present disclosure will be described in greater detail with reference to the accompanying drawings.

The term "module" used in the present disclosure may include a unit configured with hardware, and may be used interchangeably with terms such as component, or circuit, and the like. The module may be an integrally configured component or a minimum unit or part thereof that performs one or more functions. For example, a module may be configured with an application-specific integrated circuit (ASIC).

Figure 1:
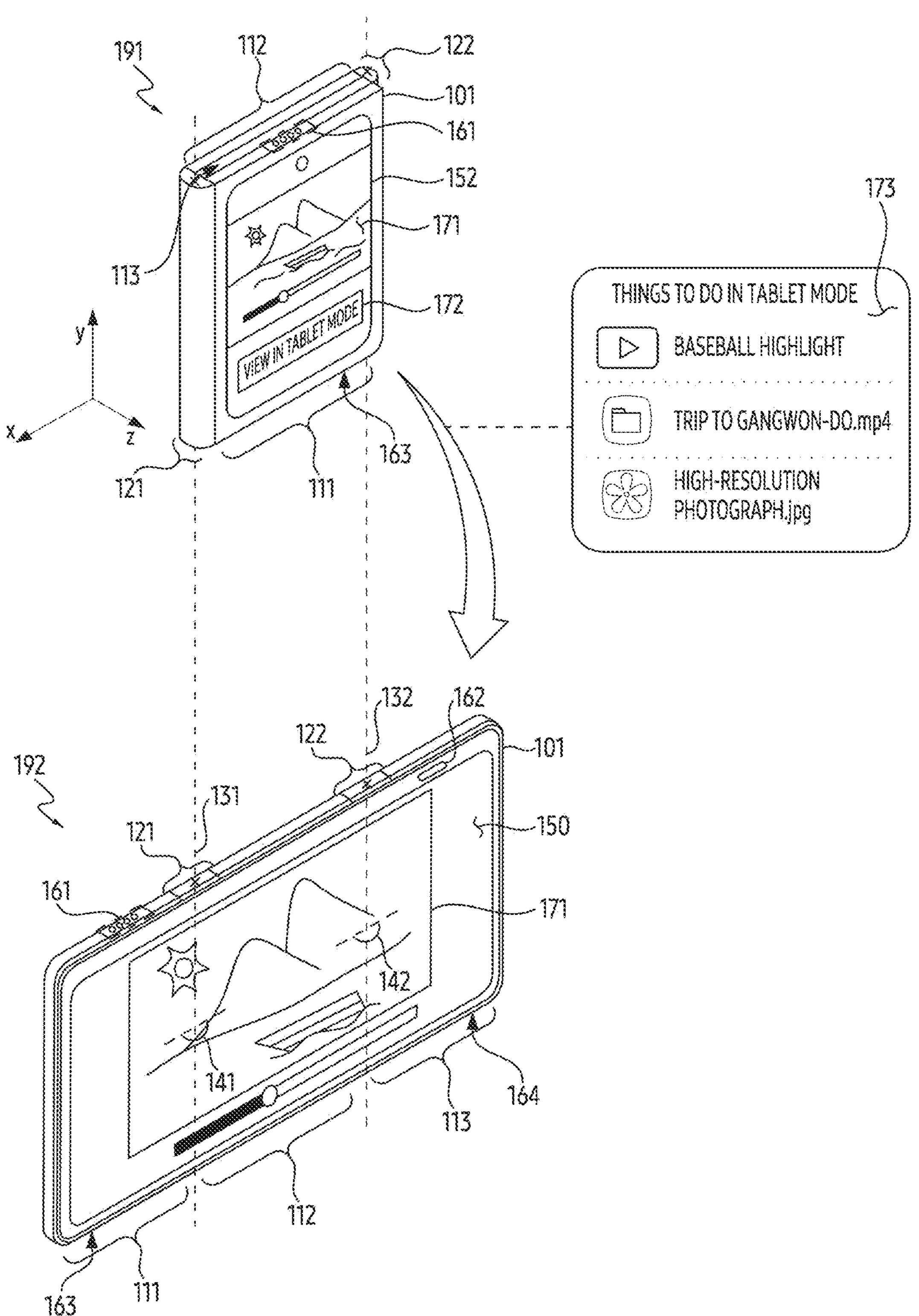
FIG. 1 is a diagram illustrating an example of an electronic device including a multi-foldable housing according to various embodiments.

FIG. 1 is a diagram illustrating an example electronic device 101 including a multi-foldable housing according to various embodiments. In an embodiment, in terms of being owned by a user, the electronic device 101 may be referred to as a terminal (or user terminal). The terminal may include, for example, a personal computer (PC), such as a laptop and a desktop. The terminal may include, for example, a smartphone, a smartpad, and/or a tablet PC. The terminal may include a smart accessory such as a smartwatch and/or a head-mounted device (HMD). However, it will be understood that the disclosure is not limited thereto.

Referring to FIG. 1, the electronic device 101 according to an embodiment may include a deformable housing. The housing of the electronic device 101 may be referred to as a multi-foldable housing. The multi-foldable housing of the electronic device 101 may be distinguished into a plurality of housings (assemblies). For example, the housing of the electronic device 101 of FIG. 1 may include a first housing 111, a second housing 112, and a first hinge assembly 121 for rotatably coupling the first housing 111 and the second housing 112. Based on the first hinge assembly 121, a relative position, angle, shape, and/or distance of the first housing 111 and the second housing 112, which are rigid bodies, may be changed by an external force.

According to an embodiment, the housing of the electronic device 101 may include the second housing 112, a third housing 113, and a second hinge assembly 122 for rotatably coupling the second housing 112 and the third housing 113. Based on the second hinge assembly 122, a relative position, angle, shape, and/or distance of the second housing 112 and the third housing 113 may be changed by the external force. Based on the first hinge assembly 121 and the second hinge assembly 122, the electronic device 101 may have a structure that may be folded once or more. In an embodiment, a housing such as the first housing 111, the second housing 112, and the third housing 113 may be referred to as a housing assembly, a housing part, a sub-housing, a flat housing, and/or a rigid housing. In an embodiment, a hinge assembly including the first hinge assembly 121 and the second hinge assembly 122 may be referred to as a hinge housing, a folding housing, a hinge, a joint housing, and/or a flexible housing.

Referring to FIG. 1, a first folding axis 131 and/or a second folding axis 132 formed along a y-axis direction are illustrated. The first folding axis 131 may be a rotation axis of the first housing 111 and the second housing 112 connected through the first hinge assembly 121, and may be formed in the first hinge assembly 121. As the first housing 111 and/or the second housing 112 are rotated based on the first folding axis 131, a first angle 141 between the first housing 111, the first hinge assembly 121, and the second housing 112 may be changed. The second folding axis 132 is a rotation axis of the second housing 112 and the third housing 113 connected through the second hinge assembly 122 and may be formed in the second hinge assembly 122. As the second housing 112 and/or the third housing 113 are rotated based on the second folding axis 132, a second angle 142 between the second housing 112, the second hinge assembly 122, and the third housing 113 may be changed. In terms of including a plurality of deformable folding axes, such as the first folding axis 131 and the second folding axis 132, the electronic device 101 may be referred to as a multi-foldable electronic device.

Referring to FIG. 1, different states 191 and 192 of the electronic device 101 distinguished by a shape and/or exterior are illustrated. Referring to the state 191 of FIG. 1, the electronic device 101 may include a cover display 152 positioned on a first surface (e.g., a front surface of the electronic device 101) of the first housing 111. Referring to the state 192 of FIG. 1, the electronic device 101 according to an embodiment may include a flexible display 150 positioned on a second surface of the first housing 111 (e.g., a second surface opposite to the first surface of the first housing 111), a third surface of the second housing 112, and a fourth surface of the third housing 113. The second surface of the first housing 111, the third surface of the second housing 112, and the fourth surface of the third housing 113 may form a rear surface (or back surface) of the electronic device 101.

Referring to FIG. 1, the flexible display 150 may extend from the second surface of the first housing 111 to the fourth surface of the third housing 113 across the third surface of the second housing 112. For example, the flexible display 150 may be positioned from the first housing 111 to the third housing 113 across the first hinge assembly 121, the second housing 112, and the second hinge assembly 122. For example, the flexible display 150 may be positioned on the front surface of the electronic device 101, and the first hinge assembly 121 and/or the second hinge assembly 122 may be positioned on the rear surface of the electronic device 101. The first hinge assembly 121 and/or the second hinge assembly 122 may be adjacent to a surface opposite to one surface of the flexible display 150 that is visible to the outside. Hereinafter, the first angle 141 may correspond to an angle between the second surface of the first housing 111 and the third surface of the second housing 112 on which the flexible display 150 is positioned, which may be folded by the first folding axis 131 of the first hinge assembly 121. Hereinafter, the second angle 142 may correspond to an angle between the third surface of the second housing 112 and the fourth surface of the third housing 113 on which the flexible display 150 is positioned, which may be folded by the second folding axis 132 of the second hinge assembly 122.

In an embodiment, the flexible display 150 may be referred to as a display, a deformable display, and/or a deformable panel. In terms of size, the flexible display 150 may be referred to as a large display, and the cover display 152 may be referred to as a small display. In terms of location, the flexible display 150 may be referred to as a rear display (or front display) and/or an inner display, and the cover display 152 may be referred to as a front display (or rear display) and/or an outer display. In terms of deformability, the flexible display 150 may be referred to as a deformable display, and the cover display 152 may be referred to as a rigid display. An example hardware configuration of the electronic device 101 including the flexible display 150 and/or the cover display 152 is described with reference to FIG. 2.

Referring to FIG. 1, an example exterior of the electronic device 101 illustrated based on three axes (x-axis, y-axis, and z-axis) perpendicular to each other is illustrated. A length of the flexible display 150 in the x-axis direction may be longer than a length in the y-axis direction. The disclosure is not limited thereto. A length of the cover display 152 in the x-axis direction may be shorter than a length in the y-axis direction. In the present disclosure, a width and height may correspond to lengths of each of two sides perpendicular to each other in an object having a rectangular shape. The rectangle may include a rectangle having a round-shaped shape, such as the flexible display 150 and/or the cover display 152 of FIG. 1. The width, height, and mapping between the two sides may change according to a relationship between the object and a reference direction (e.g., a direction toward the ground and/or a direction of gravitational acceleration). Hereinafter, an aspect ratio may indicate a ratio of the width and height of the rectangular object.

Different states of the electronic device 101 that are distinguished by the shape and/or exterior, including the states 191 and 192, are described in greater detail with reference to FIGS. 3A and/or 3B. The electronic device 101 according to an embodiment may receive an input (or user input) for designating a software application and/or media content to be executed in a state different from a specific state in the specific state. Based on switching from the specific state to the other state, the electronic device 101 may execute the software application and/or media content corresponding to the input. An operation of the electronic device 101 that executes the software application and/or media content based on switching of the state is described with reference to FIG. 4. Referring to the states 191 and 192, screens displayed or provided in different states 191 and 192 of the electronic device 101 may have distinct widths, heights, areas, sizes, and/or aspect ratios. The width, height, area, size, and/or aspect ratio of the screen provided by the electronic device 101 may be associated with a shape of the electronic device 101 and/or a shape of a display (e.g., the flexible display 150 and/or the cover display 152) visible to the outside based on the shape.

In the present disclosure, a mode of the electronic device 101 may be distinguished by dimensions such as the width, height, area and/or size of at least a portion of a display (e.g., the flexible display 150 and/or the cover display 152) enabled to provide the screen. The mode may include a first mode (or a phone mode) that provides the screen through a display of a relatively small size (or a size less than a threshold), and a second mode (or a tablet mode) that provides the screen through a display of a relatively large size (or a size greater than or equal to the threshold). The electronic device 101 according to an embodiment may switch between the phone mode or the tablet mode based on the shape of the electronic device 101, which is distinguished by a posture of the first housing 111, the second housing 112, and the third housing 113. In the switched mode, the electronic device 101 may display a screen suitable for the current mode of the electronic device 101 using the flexible display 150 and/or the cover display 152.

Referring to FIG. 1, in an embodiment of the electronic device 101 including the flexible display 150 and the cover display 152, the state 191 of the electronic device 101 that executes a software application using the cover display 152 having a relatively small size may be included in the first mode and/or the phone mode. The state 192 of the electronic device 101 that displays the screen provided by the software application using the flexible display 150 may be included in the second mode and/or the tablet mode.

Referring to FIG. 1, in the state 191 associated with the first mode and/or the phone mode, the electronic device 101 according to an embodiment may execute one or more software applications based on the cover display 152. The electronic device 101 may identify or confirm the posture of the first housing 111, the second housing 112, and the third housing 113 using one or more sensors of the electronic device 101. Based on the confirmed posture, the electronic device 101 may selectively enable either the flexible display 150 or the cover display 152. The electronic device 101 may execute one or more software applications through an enabled display. Referring to FIG. 1, the example state 191 of the electronic device 101 that executes a software application for reproducing media content such as a video 171 is illustrated, but the disclosure is not limited thereto.

According to an embodiment, referring to FIG. 1, in the state 191 in which the cover display 152 is enabled based on the first mode and/or the phone mode, the electronic device 101 may identify or receive an input for specifying the software application and/or media content to be executed in the second mode (e.g., the tablet mode) different from the first mode. The electronic device 101 may display a visual object 172 for receiving the input on the cover display 152. Although the visual object 172 having a shape of a button is illustrated as an example, the disclosure is not limited thereto. In the visual object 172, the electronic device 101 may display a designated text (e.g., "view in tablet mode") for guiding display of the software application and/or media content in a mode different from the current mode (e.g., the phone mode) of the electronic device 101. For example, a user may touch the visual object 172 to view the video 171 through the flexible display 150 of the relatively large size while viewing the video 171 through the cover display 152 of the relatively small size.

According to an embodiment, an input associated with the visual object 172 (e.g., a touch input on a portion of the cover display 152 on which the visual object 172 is displayed) may include an input for the electronic device 101 displaying media content (e.g., the video 171) corresponding to the visual object 172 in the second mode different from the first mode. In the first mode, the electronic device 101 may sequentially and/or simultaneously receive inputs for specifying the software application and/or media content to be executed in the second mode. The electronic device 101 may generate, update, and/or manage a list of the software application and/or media content to be provided in the second mode, based on the received inputs.

Referring to FIG. 1, the electronic device 101 may visualize the list using a visual object 173. The visual object 173 having a shape of a rectangular panel and/or menu is illustrated, the disclosure is not limited thereto. The visual object 173 may be provided by a system process (e.g., a notification manager), such as a notification center or a notification panel. Through the visual object 173, the electronic device 101 may receive an input for adding, deleting, and/or changing the software application and/or media content included in the list. An operation of the electronic device 101 managing the software application and/or media content based on the list is described in greater detail below with reference to FIGS. 5A, 5B, 5C, 6A, 6B, 6C, 7, 8, and/or 9A, 9B and 9C.

Referring to FIG. 1, the electronic device 101 may execute a software application and/or media content corresponding to the input received in the state 191 based on switching from the state 191 in which the input with respect to the visual object 172 is received to the state 192. In the state 191 associated with the first mode, the electronic device 101, which has identified the input associated with the visual object 172 corresponding to the video 171, may display the video 171 on the flexible display 150 after switching to the state 192 associated with the second mode. In the state 192 associated with the tablet mode, the electronic device 101 may display the video 171 using the flexible display 150 having the relatively large size.

According to an embodiment, based on switching from the state 191 to the state 192, the electronic device 101 may collectively execute at least one software application and/or media content included in a list of the software application and/or media content (e.g., a list indicated by the visual object 173).

As described above, the electronic device 101 according to an embodiment may display a software application and/or media content that has been reserved by a user in response to a change in the mode. The electronic device 101 may display a list of at least one software application and/or media content that has been reserved by the user, such as the visual object 173, in response to a change in the mode. For example, the electronic device 101, which has identified switching from the state 191 corresponding to the phone mode to the state 192 corresponding to the tablet mode, may display the visual object 173 on the flexible display 150. Similarly, the electronic device 101, which has identified switching from the state 192 corresponding to the tablet mode to the state 191 corresponding to the phone mode, may display, on the cover display 152, a list of the software application and/or media content reserved to execute in the phone mode. The disclosure is not limited thereto, and the electronic device 101 may display the list of the software application and/or media content in an intermediate mode and/or an intermediate state between the phone mode and the tablet mode.

Hereinafter, an example hardware configuration included in the electronic device 101 according to an embodiment is described in greater detail with reference to FIG. 2.

Figure 2:
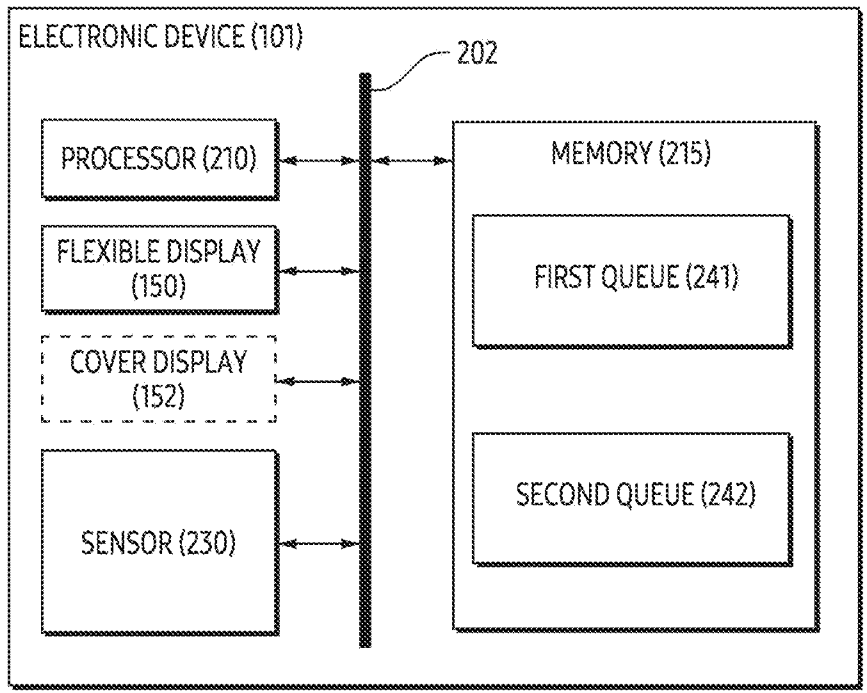
FIG. 2 is a block diagram illustrating an example configuration of an electronic device according to various embodiments.

FIG. 2 is a block diagram illustrating an example configuration of an electronic device 101 according to various embodiments. The electronic device 101 of FIG. 1 may include hardware of the electronic device 101 described with reference to FIG. 2. Referring to FIG. 2, the electronic device 101 according to an embodiment may include at least one of a processor (e.g., including processing circuitry) 210, a memory 215, a flexible display 150, a cover display 152, and/or a sensor 230. The processor 210, the memory 215, the flexible display 150, the cover display 152, and the sensor 230 may be electronically and/or operably coupled with each other by an electronic component, such as a communication bus 202.

In an embodiment, that the hardware components of the electronic device 101 are operably coupled may refer, for example, to a direct connection or an indirect connection between the hardware components being established wired or wirelessly such that a second hardware component is controlled by a first hardware component among the hardware components. Although illustrated based on different blocks, the disclosure is not limited thereto, and a portion of the hardware of FIG. 2 (e.g., at least a portion of the processor 210, the memory 215, and the sensor 230) may be included in a single integrated circuit, such as a system on a chip (SoC). The hardware components of the electronic device 101 distinguished into blocks may be located or included in at least one of a first housing 111, a second housing 112, or a third housing 113 described with reference to FIG. 1. The type and/or number of hardware components included in the electronic device 101 are not limited to those illustrated in FIG. 2. For example, the electronic device 101 may include only a portion of the hardware components illustrated based on the blocks of FIG. 2.

The processor 210 of the electronic device 101 according to an embodiment may include hardware and/or various processing circuitry for processing data based on one or more instructions. The hardware and/or circuitry for processing data may include, for example, an arithmetic and logic unit (ALU), a floating point unit (FPU), a field programmable gate array (FPGA), a central processing unit (CPU), and/or an application processor (AP). The number of the processor 210 may be one or more. For example, the processor 210 may have a structure of a multi-core processor such as a dual core, a quad core, or a hexa core. The processor 210 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The memory 215 of the electronic device 101 according to an embodiment may include a hardware component for storing data and/or instruction inputted and/or outputted to and from the processor 210. The memory 215 may include, for example, a volatile memory such as a random-access memory (RAM) and/or a non-volatile memory such as a read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of programmable ROM (PROM), erasable PROM (EPROM), electrically erasable PROM (EEPROM), flash memory, hard disk, compact disk, solid state drive (SSD), and embedded multi-media card (eMMC).

The flexible display 150 of the electronic device 101 according to an embodiment may output visualized information (e.g., screens of FIGS. 1, 5A to 5C, 6A to 6C, 7 to 8, and 9A to 9C) to a user. For example, the flexible display 150 may output visualized information to the user by being controlled by a controller such as a graphic processing unit (GPU) and/or the processor 210. The flexible display 150 may include a liquid crystal display (LCD), a plasma display panel (PDP), and/or one or more light emitting diodes (LEDs). The LED may include an organic LED (OLED). The flexible display 150 may include an electronic paper. As described above with reference to FIG. 1, the flexible display 150 may have a shape that is at least partially curved and/or a deformable shape. Hereinafter, an active region and/or a display area of the flexible display 150 may correspond to at least a portion of the flexible display 150 including one or more enabled pixels.

The flexible display 150 of the electronic device 101 according to an embodiment may include a sensor (e.g., a touch sensor panel (TSP)) for detecting an external object (e.g., a user's finger) on the flexible display 150. For example, based on the TSP, the electronic device 101 may detect an external object floating on the flexible display 150 or in contact with the flexible display 150. In response to detecting the external object, the electronic device 101 may execute a function associated with a specific visual object corresponding to a location of the external object on the flexible display 150 among visual objects displayed on the flexible display 150.

The cover display 152 of the electronic device 101 according to an embodiment may output visualized information to the user, similar to the flexible display 150. The cover display 152 may be positioned in a portion different from a portion of the electronic device 101 on which the flexible display 150 is positioned. In the description of the cover display 152, a portion overlapping the flexible display 150 may be omitted.

The sensor(s) 230 of the electronic device 101 according to an embodiment may generate electrical information that may be processed by the processor 210 or stored in the memory 215 from non-electronic information associated with the electronic device 101. For example, the sensor 230 may include a global positioning system (GPS) sensor for detecting a geographic location of the electronic device 101. In addition to the GPS method, the sensor 230 may generate information indicating the geographic location of the electronic device 101 based on a global navigation satellite system (GNSS), such as Galileo, Beidou, and Compass. The information may be stored in the memory 215, processed by the processor 210, and/or transmitted through a communication circuitry 240 to another electronic device distinct from the electronic device 101. The sensor 230 is not limited to the above description, and may include an image sensor, an illuminance sensor, a proximity sensor, a grip sensor, and/or a ToF sensor for detecting electromagnetic waves including light.

In an embodiment, the processor 210 of the electronic device 101 may sense or identify a posture, shape, and/or direction of the electronic device 101 using the sensor 230.

The sensor 230 may include an inertial measurement unit (IMU), a hall sensor, a proximity sensor, and/or an illuminance sensor for identifying the posture, shape, and/or direction of the electronic device 101. The hall sensor may include a magnet and a magnetic field sensor that measures a change in a magnetic field formed by the magnet. The magnet and the magnetic field sensor may be positioned in different assemblies (e.g., the first housing 111, the second housing 112, and/or the third housing 113 of FIG. 1) of the housing of the electronic device 101. Based on the change in the magnetic field measured by the magnetic field sensor, the hall sensor may output sensor data indicating a distance between the portions.

For example, in an embodiment where the electronic device 101 includes a deformable housing, the processor 210 of the electronic device 101 may identify a shape of the housing or identify parameters (e.g., the first angle 141 and/or the second angle 142 of FIG. 1) associated with the shape using the magnet positioned in different parts of the housing (e.g., the first housing assembly 111, the second housing assembly 112, and/or the third housing assembly 113 of FIG. 1) and a hall sensor 234 including the magnetic field sensor. For example, the hall sensor 234 may output sensor data indicating the distance and/or the shape of the housing.

The IMU according to an embodiment may include an acceleration sensor, a gyro sensor, a geomagnetic sensor, or any combination thereof. The acceleration sensor may output an electrical signal indicating gravitational acceleration and/or acceleration of each of a plurality of axes (e.g., x-axis, y-axis, and z-axis) perpendicular to each other. The gyro sensor may output an electrical signal indicating an angular velocity (e.g., an angular velocity based on a roll, a pitch, and/or a yaw) of each of the plurality of axes. The geomagnetic sensor may output an electrical signal indicating a size of the magnetic field formed in the electronic device 101 along each of the plurality of axes (e.g., x-axis, y-axis, and/or z-axis). The processor 210 may repeatedly obtain data indicating acceleration, angular velocity, and/or the size of the magnetic field from the IMU based on a designated period (e.g., 1 millisecond). The processor 210 may identify parameters (e.g., the first angle 141 and/or the second angle 142 of FIG. 1) associated with the shape of the electronic device 101 using the hall sensor and/or the IMU. Based on the parameters, the processor 210 may identify the current shape of the electronic device 101 from among designated shapes (e.g., the unfolded state, the folded state, and/or the sub-folded state, described with reference to FIGS. 3A and 3B) for distinguishing the shape of the electronic device 101. For example, the processor 210 of the electronic device 101 may identify the first angle 141 between the first housing 111 and the second housing 112 of FIG. 1 and/or the second angle 142 between the second housing 112 and the third housing 113 using the sensor 230.

Although not illustrated, the electronic device 101 according to an embodiment may include various outputs including various circuitry for outputting information in a form other than the visualized form. For example, the electronic device 101 may include a motor for providing haptic feedback based on vibration. For example, the electronic device 101 may include one or more speakers for outputting an audio signal, such as a first speaker 161, a second speaker 162, a third speaker 163, or a fourth speaker 164 of FIGS. 3A to 3B.

In the memory 215 of the electronic device 101 according to an embodiment, one or more instructions (or commands) indicating calculation and/or operation to be performed by the processor 210 on data may be stored. A set of one or more instructions may be referred to as firmware, operating system, process, routine, sub-routine, and/or application. For example, the electronic device 101 and/or the processor 210 may perform at least one of the operations of FIG. 4 when a set of a plurality of instructions distributed in a form of the operating system, firmware, driver, and/or application are executed. Hereinafter, that an application is installed in the electronic device 101 may refer, for example, to the one or more applications being stored in an executable format (e.g., a file with an extension designated by the operating system of the electronic device 101) by the processor 210 of the electronic device 101, as one or more instructions provided in a form of the application are stored in the memory 215 of the electronic device 101.

The processor 210 of the electronic device 101 according to an embodiment may identify a state of the electronic device 101 confirmed using the sensor 230. Based on the state, the processor 210 may select or identify a mode of the electronic device 101 among a phone mode or a tablet mode. The processor 210 may enable either the flexible display 150 and/or the cover display 152 based on the selected mode. In the enabled display, the processor 210 may display a screen having a layout based on the selected mode.

As described above with reference to FIG. 1, the processor 210 may identify an input for setting a software application and/or media content to be provided in a mode different from the current mode. The processor 210 may generate or manage, in the memory 215, a plurality of queues (e.g., a first queue 241 and/or a second queue 242) for storing information on the software application and/or media content corresponding to the input.

For example, in the first queue 241, the processor 210 may store information on a software application and/or media content to be executed in a first mode (or the phone mode). For example, in the second queue 242, the processor 210 may store information on a software application and/or media content to be executed in a second mode (or the tablet mode). Although an embodiment based on the queue, such as the first queue 241 and/or the second queue 242, is described, the disclosure is not limited thereto. For example, the processor 210 may store or manage information on the software application and/or media content to be executed in a mode different from the current mode, based on data structure such as a stack, binary tree, and/or linked list.

For example, while operating based on the first mode (e.g., the phone mode), the processor 210 may receive an input for setting the software application and/or media content to be provided in the second mode. Based on the input received in the first mode, the processor 210 may store information on the software application and/or media content corresponding to the input in the second queue 242 corresponding to the second mode. The information may include a link (e.g., uniform resource location (URL) and/or uniform resource indicator (URI)) with respect to the software application and/or media content, a file path, and/or a file itself. The disclosure is not limited thereto, and the information may include an object defined by an operating system (e.g., an Android operating system) executed by the processor 210, such as an intent. In an embodiment of storing information including the intent, the processor 210 may store a software application corresponding to the input and data indicating media content to be provided through the software application in extra data of the intent.

In an embodiment, after storing, in the second queue 242, at least one software application and/or at least one media content corresponding to one or more inputs received in the first mode, the processor 210 may identify switching from the first mode to the second mode based on deformation of the electronic device 101 identified based on the sensor 230. In the second mode or while switching from the first mode to the second mode, the processor 210 may display a list with respect to at least one software application and/or at least one media content stored in the second queue 242 on the flexible display 150 and/or the cover display 152. Based on a user input with respect to the list, the processor 210 may select the software application and/or media content to be executed in the second mode from the list. After switching to the second mode, the processor 210 may display the software application and/or media content selected from the list on a display corresponding to the second mode.

Although the operation of the processor 210 while switching from the first mode to the second mode has been described, the disclosure is not limited thereto. For example, in the second mode, the processor 210 may receive an input for reserving a software application and/or media content to be executed in the first mode. In response to the input, the processor 210 may store information on the software application and/or media content corresponding to the input in the first queue 241 corresponding to the first mode. The processor 210 may provide a list of the software application and/or media content based on information stored in the first queue 241 while switching from the second mode to the first mode based on the deformation of the electronic device 101. Based on a user input associated with the list, the processor 210 may confirm or identify the software application and/or media content to be executed after switching to the first mode.

Hereinafter, with reference to FIGS. 3A and/or 3B, an example of an operation of the processor 210 that confirms the state of the electronic device 101 using the sensor 230 and determines the current mode of the electronic device 101 among the first mode or the second mode based on the confirmed state is described.

Figure 3A:
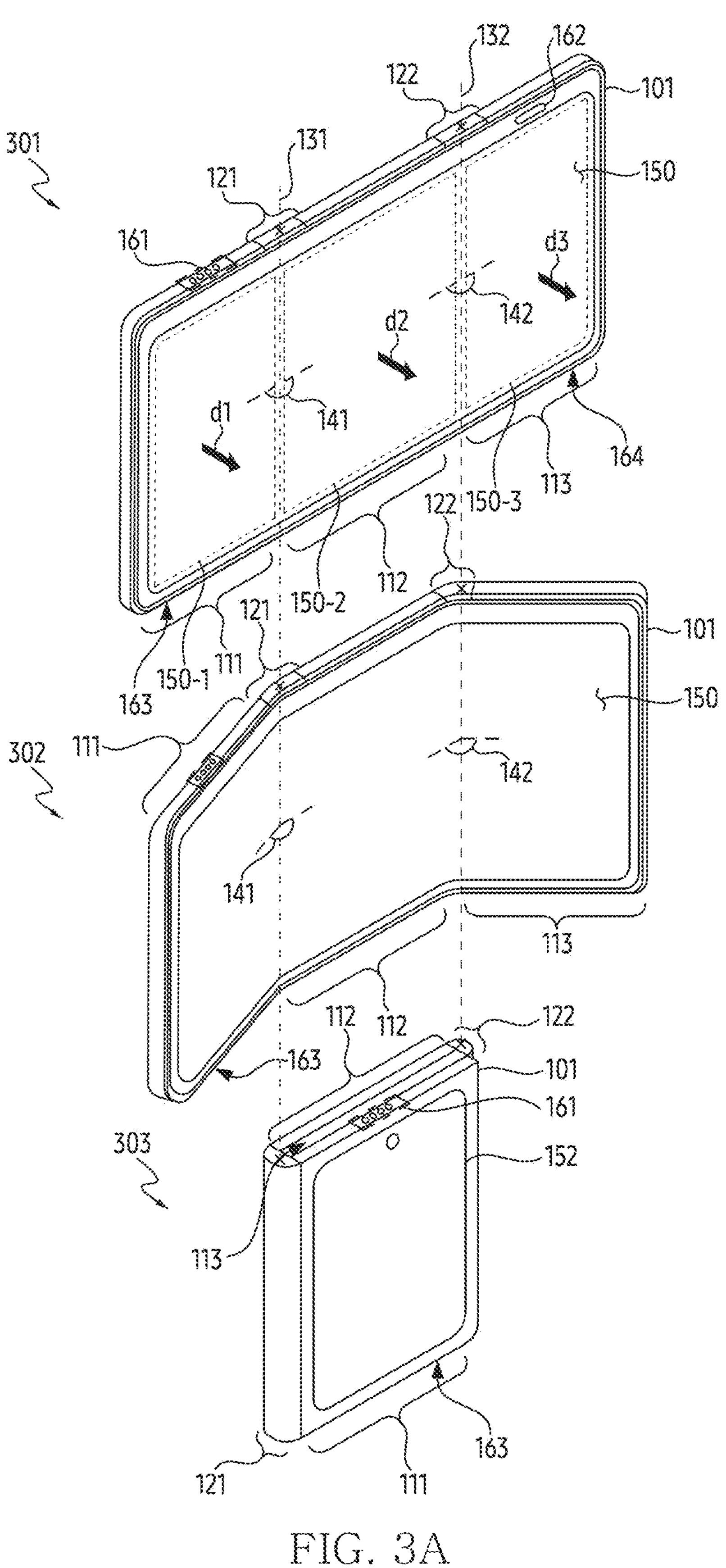
FIGS. 3A and 3B are diagrams illustrating an example deformable electronic device according to various embodiments.
Figure 3B:
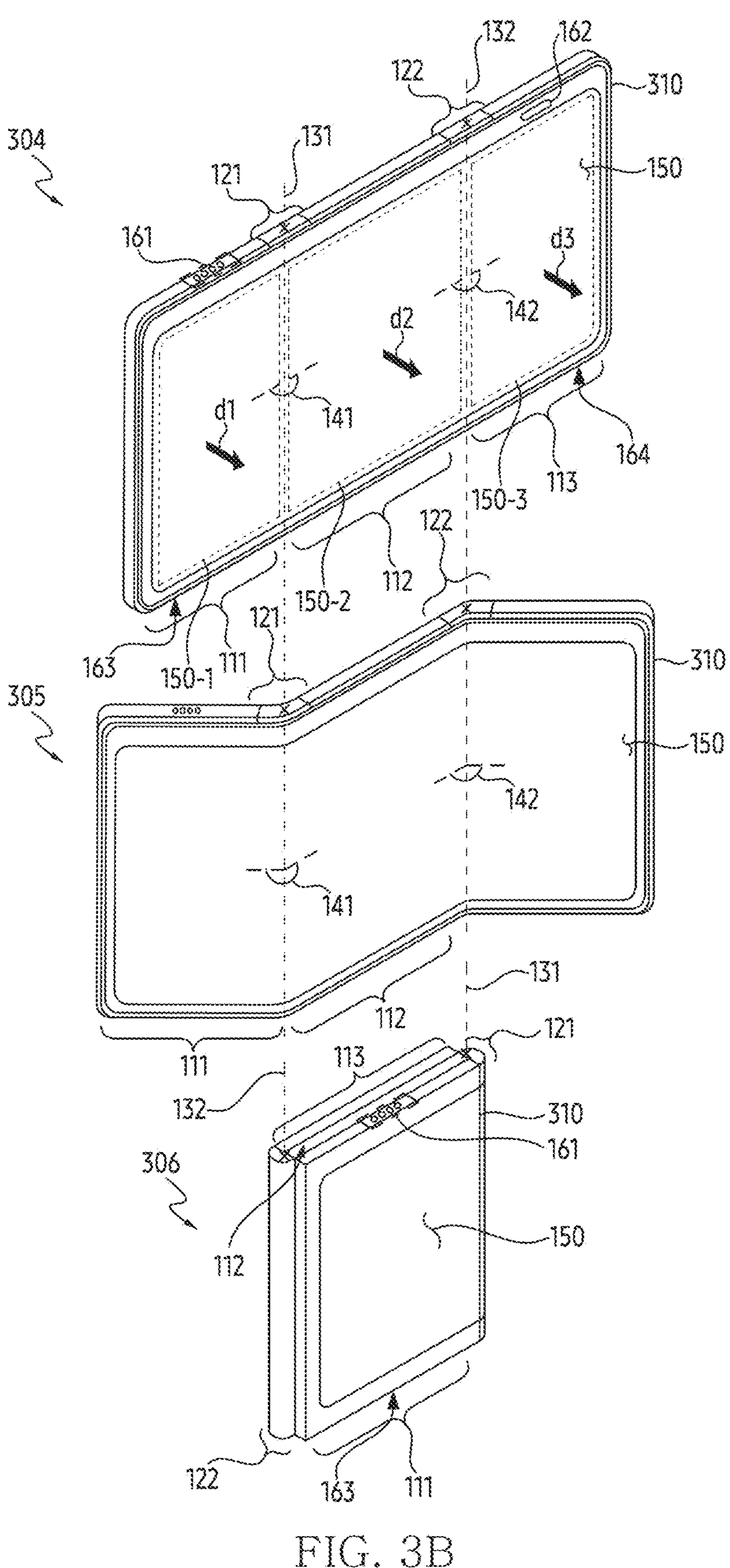

FIGS. 3A and 3B are diagrams illustrating examples of a deformable electronic device 101 according to various embodiments. The electronic device 101 of FIGS. 1 and/or 2 may have an exterior of the electronic device 101 described with reference to FIGS. 3A and/or 3B.

Referring to FIGS. 3A and/or 3B, different shapes of the electronic device 101 supporting deformability based on a plurality of folding axes (e.g., the first folding axis 131 and/or the second folding axis 132) are illustrated. Referring to FIG. 3A, the electronic device 101 including a flexible display 150 that is completely visually covered by a first housing 111 to a third housing 113 folded along the first folding axis 131 and the second folding axis 132 is illustrated. The electronic device 101 may include a first speaker 161 and/or a third speaker 163 positioned in the first housing 111. The electronic device 101 may include a second speaker 162 and/or a fourth speaker 164 positioned in the third housing 113. The third speaker 163 may be positioned at a second edge of the first housing 111 opposite to a first edge of the first housing 111 on which the first speaker 161 is positioned. The fourth speaker 164 may be positioned at a second edge of the third housing 113 opposite to a first edge of the third housing 113 on which the second speaker 162 is positioned. Although the second speaker 162 positioned on one surface of the third housing 113 where a flexible display 150 is positioned and the first speaker 161, the third speaker 163, and the fourth speaker 164 positioned on a side surface connected to a front surface of the electronic device 101 are illustrated, the locations of speakers (e.g., the first speaker 161 to the fourth speaker 164) included in the electronic device 101 are not limited to the locations illustrated in FIG. 3A. The number of speakers included in the electronic device 101 is not limited to the four speakers (e.g., the first speaker 161 to the fourth speaker 164) illustrated in FIG. 3A.

Referring to FIG. 3A, different states (e.g., a first state 301, a second state 302 and/or a third state 303) of the electronic device 101 distinguished by a first angle 141 and a second angle 142 are illustrated. The first state 301 of the electronic device 101 in which the first angle 141 and the second angle 142 are substantially a straight angle (e.g., about 180°) may be referred to as a fully unfolded state, an outspread state, an opened state, an unfolded state, a flat state, and/or a planar state. In the first state 301, the flexible display 150 positioned from the first housing 111 across the second housing 112 to the third housing 113 may have a substantially flat shape. The flexible display 150 may include a first portion (or region) 150-1 positioned on the first housing 111, a second portion 150-2 positioned on the second housing 112, and a third portion 150-3 positioned on the third housing 113. In the first state 301, a single plane may be formed on a front surface of the electronic device 101 on which the flexible display 150 is positioned. In the first state 301, directions d1, d2, and d3 of front surfaces of the first housing 111, the second housing 112, and the third housing 113 may be substantially parallel to each other and/or the same. A state 191 of FIG. 1 may correspond to or be included in the first state 301 and/or the unfolded state of FIG. 3A.

Referring to FIG. 3A, the second state 302 of the electronic device 101 in which at least one of the first angle 141 or the second angle 142 is less than a straight angle (e.g., 180°) is illustrated. The state of the electronic device 101, including the second state 302, in which the first angle 141 and/or the second angle 142 is less than the straight angle may be referred to as an in-folded state, a sub-outspread state (or a sub-folded state), an intermediate state, and/or a concave state. Although only a second hinge assembly 122 of a first hinge assembly 121 and the second hinge assembly 122 is illustrated as folded, the disclosure is not limited thereto, and the sub-folded state may include a state in which both the first angle 141 and the second angle 142 are less than the straight angle and exceed 0°. In the sub-folded state, a plurality of planes may be formed by the flexible display 150 folded by at least one hinge assembly. In the sub-folded state, such as the second state 302, a boundary line between flat portions of the flexible display 150 may be formed on either of the first hinge assembly 121 and/or the second hinge assembly 122. For example, the flat portions of the flexible display 150 distinguished by the second hinge assembly 122 may face different directions that are not parallel. The state 192 of FIG. 1 may correspond to or be included in the second state 302 and/or the in-folded state of FIG. 3A.

Referring to FIG. 3A, the third state 303 of the electronic device 101 in which both the first angle 141 and the second angle 142 are substantially 0° may be referred to as a fully folded state, a folded state, and/or a closed state. In the third state 303, the flexible display 150 may be completely visually covered by the first housing 111 to the third housing 113. For example, in the folded state, a size of the flexible display 150 of the electronic device 101 visible to the outside may be substantially zero. Referring to FIG. 3A, the example third state 303 is illustrated in which each of a front surface and a rear surface of the third housing 113, where a portion of the flexible display 150 (e.g., a first display) is positioned, is covered by the first housing 111 and the second housing 112, but the disclosure is not limited thereto. The electronic device 101 including the flexible display 150 that is completely visually covered in the folded state may include a cover display 152 (e.g., a second display) positioned on the rear surface opposite to the front surface on which the flexible display 150 is positioned. Referring to FIG. 3A, one surface of the first housing 111 on which the flexible display 150 is positioned and another surface of the first housing 111 on which the cover display 152 is positioned may be opposite to each other.

Referring to FIG. 3A, the electronic device 101 including the flexible display 150 configured to be folded at an angle of less than or equal to the straight angle (e.g., about 180°) along the first folding axis 131 and the second folding axis 132 may be referred to as a G-shaped foldable electronic device. Referring to FIG. 3B, different forms of an electronic device 310 including a flexible display 150 configured to be folded at an angle exceeding the straight angle along at least one of the first folding axis 131 and the second folding axis 132 are illustrated. The electronic device 310 may be referred to as an S-shaped (or Z-shaped) foldable electronic device. The electronic device 310 of FIG. 3B may include the hardware configuration of the electronic device 101 described above with reference to FIG. 2.

Referring to FIG. 3B, different states (e.g., a fourth state 304 to a sixth state 306) of the electronic device 310 distinguished by the first angle 141 and the second angle 142 are illustrated. The fourth state 304 of the electronic device 310 may correspond to the first state 301 of the electronic device 101 of FIG. 3A. In the fourth state 304 corresponding to the unfolded state, a flat plane may be formed by the flexible display 150. For example, the direction d1 of the first portion 150-1 of the flexible display 150 positioned on the first housing 111, the direction d2 of the second portion 150-2 of the flexible display 150 positioned on the second housing 112, and the direction d3 of the third portion 150-3 positioned on the third housing 113 may be substantially the same.

Referring to FIG. 3B, a fifth state 305 of the electronic device 310 in which the first angle 141 exceeds the straight angle and the second angle 142 is the substantially straight angle is illustrated. The state of the electronic device 310 where the first angle 141 and/or the second angle 142 exceeds the straight angle and is less than 360° may be referred to as an out-folded state, a sub-folded state, and/or a convex state. Although only the first angle 141 of the first angle 141 and the second angle 142 is illustrated as exceeding the straight angle, the disclosure is not limited thereto. In the convex state including the fifth state 305, a plurality of planes formed by the flexible display 150 folded by the first hinge assembly 121 may face different directions.

Referring to FIG. 3B, the sixth state 306 of the electronic device 310 in which the first angle 141 is substantially 360° and the second angle 142 is substantially 0° may be referred to as a fully folded state, a folded state, and/or a closed state. In the sixth state 306, among the portions of the flexible display 150 positioned in each of the first housing 111 to the third housing 113, only the portion of the flexible display 150 positioned on the first housing 111 may be visible to the outside.

The electronic device (e.g., the electronic device 101 of FIG. 3A and/or the electronic device 310 of FIG. 3B) according to an embodiment may identify the state of the electronic device (e.g., any one of the unfolded state, the folded state, the in-folded state, and/or the out-folded state) that is confirmed by a sensor (e.g., the sensor 230 of FIG. 2) and distinguished by a posture of the first housing 111, the second housing 112, and the third housing 113. Based on the state, the electronic device may determine a mode (e.g., the phone mode and/or tablet mode) of the electronic device 101 associated with a layout of a screen to be displayed on the display (e.g., the flexible display 150 and/or the cover display 152) of the electronic device.

For example, in the state 301 of FIG. 3A included in the unfolded state, the electronic device 101 may execute one or more software applications using the flexible display 150 based on the tablet mode. For example, in the state 303 of FIG. 3A included in the folded state, the electronic device 101 may execute one or more software applications using the cover display 152 based on the phone mode. The electronic device 101 of FIG. 3A may switch between the tablet mode and the phone mode based on switching between the states 301, 302, and 303. Based on switching between the tablet mode and the phone mode, the operation of the electronic device 101 of FIG. 3A executing a software application and/or media content is described in greater detail below with reference to FIGS. 5A, 5B, 5C, 6A, 6B, 6C, 7 and 8.

Referring to FIG. 3B, in the state 304 included in the unfolded state, the electronic device 310 may execute one or more software applications using the entire active region of the flexible display 150 based on the tablet mode. In the state 306 of FIG. 3B included in the folded state, the electronic device 310 may execute one or more software applications using a portion of the flexible display 150 positioned on the first housing 111 based on the phone mode. The operation of the electronic device 310 of FIG. 3B executing a software application and/or media content based on switching between the tablet mode and the phone mode is described in greater detail below with reference to FIGS. 9A, 9B and 9C.

Hereinafter, with reference to FIG. 4, an operation of an electronic device displaying content including a software application and/or media content is described in greater detail, based on the form described with reference to FIGS. 3A and/or 3B.

Figure 4:
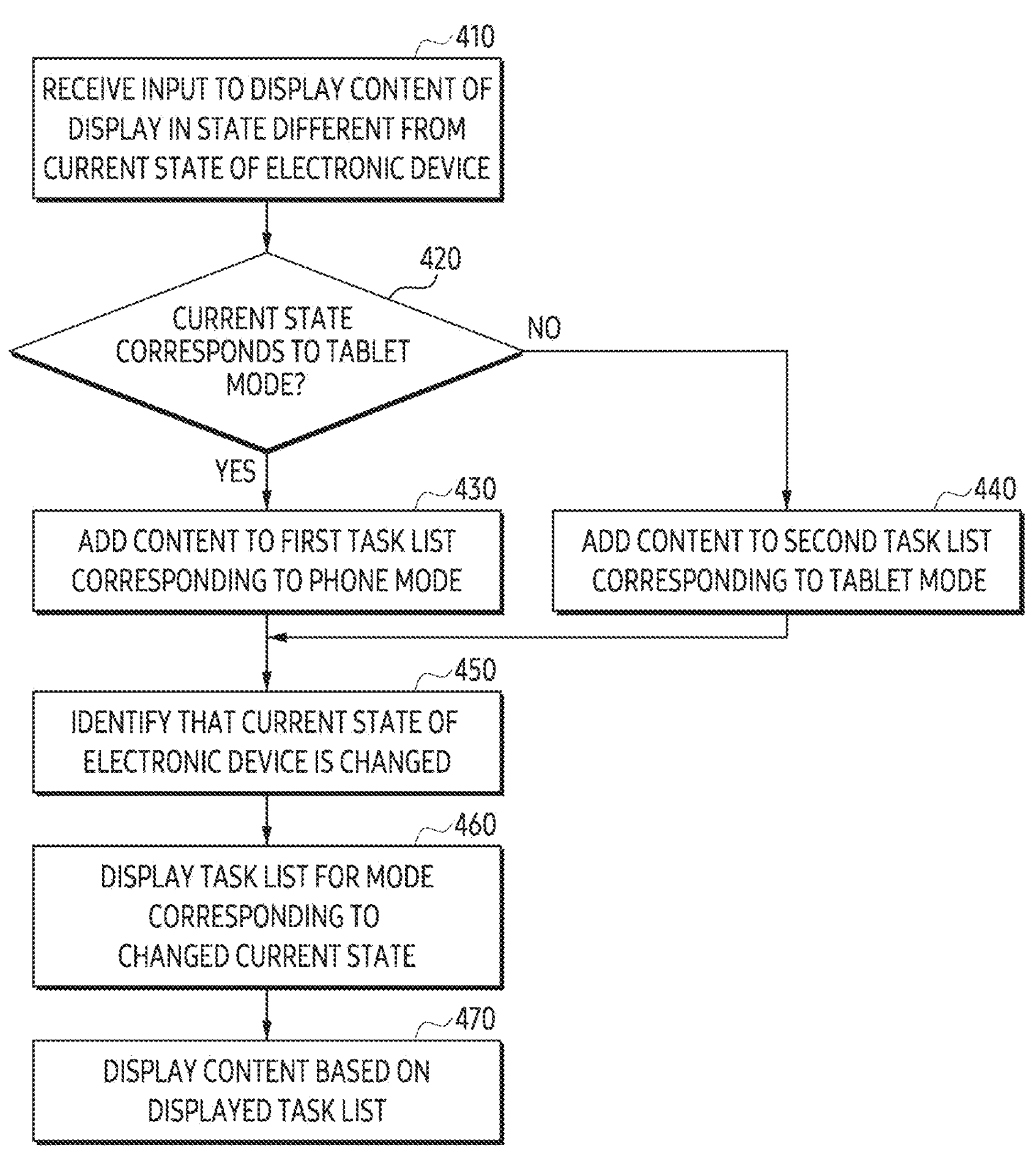
FIG. 4 is a flowchart illustrating an example method of operating an electronic device according to various embodiments.

FIG. 4 is a flowchart illustrating an example method of operating an electronic device according to various embodiments. An operation of the electronic device described with reference to FIG. 4 may, for example, be performed by an electronic device 101 of FIGS. 1, 2, and 3A, an electronic device 310 of FIG. 3B, and/or a processor 210 of FIG. 2.

Referring to FIG. 4, in operation 410, a processor of the electronic device according to an embodiment may receive an input for displaying content of a display in a state different from the current state of the electronic device. The display of operation 410 may include a flexible display 150 and/or a cover display 152 of FIG. 2. The processor may identify the current state of the electronic device based on a posture of a housing (e.g., the first housing 111, the second housing 112 and/or the third housing 113 of FIGS. 3A and/or 3B) of the electronic device confirmed by sensor data of a sensor (e.g., the sensor 230 of FIG. 2).

According to an embodiment, the processor may receive an input of the operation 410 based on an option and/or a context menu associated with the content. The context menu may be provided or displayed in response to a designated gesture and/or a designated input, such as a long touch gesture (or a double tap gesture). The gesture for displaying the context menu is not limited to the above-described long touch gesture. A visual object 172 of FIG. 1 may be an example of the option displayed by the processor to receive the input of the operation 410. The processor that receives the input of the operation 410 may perform operation 420 of FIG. 4.

Referring to FIG. 4, in operation 420, the processor of the electronic device according to an embodiment may identify whether the current state of the electronic device corresponds to the tablet mode. In an embodiment including the flexible display 150 of FIG. 2, the processor may display a software application and/or media content using the entire active region of the flexible display 150 based on the tablet mode. For example, in the tablet mode, the entire active region of the flexible display may be occupied for execution of the software application and/or media content. In case that the current state corresponds to the tablet mode (420—yes), the processor may perform operation 430. In case that the current state does not correspond to the tablet mode (e.g., in case that the current state corresponds to the phone mode) (420—no), the processor may perform operation 440.

Referring to FIG. 4, in operation 430, the processor of the electronic device according to an embodiment may add the content of the operation 410 to a first task list corresponding to the phone mode. The first task list may include a first queue 241 of FIG. 2. For example, the processor may add or store information for displaying the content of the operation 410 to the first task list. The information may include at least one of a file path of the content, at least one file including the content, a URL, a URI, or an object (e.g., an intent) for executing a software application associated with the content.

Referring to FIG. 4, in operation 440, the processor of the electronic device according to an embodiment may add the content of the operation 410 to a second task list corresponding to the tablet mode. The second task list may include a second queue 242 of FIG. 2. For example, the processor may add or store information for displaying the content of the operation 410 to the first task list. The information may be similar to the information described above based on the second task list of the operation 430.

In an embodiment, after performing at least one of operations 430 and 440, in operation 450, the processor of the electronic device may identify that the current state of the electronic device is changed. The processor may confirm the change in the current state based on the sensor data of the sensor. For example, the processor may identify the change in the current state based on the posture of the housing, which is confirmed by the sensor data. The change in the current state may cause a change in the mode of the electronic device among the phone mode or the tablet mode.

Referring to FIG. 4, in operation 460, the processor of the electronic device according to an embodiment may display a task list of a mode corresponding to the changed current state. For example, in case that the changed current state corresponds to the phone mode, the processor may display the second task list of the operation 430 on the display. For example, in case that the changed current state corresponds to the tablet mode, the processor may display the first task list of the operation 440 on the display. The operation 460 may be performed in a sub-folded state between an unfolded state and a folded state.

Referring to FIG. 4, in operation 470, the processor of the electronic device according to an embodiment may display content based on the task list displayed by the operation 460. For example, the processor may receive an input that selects a software application and/or media content in the task list. Based on the received input, the processor may display content associated with the input (e.g., a screen and/or media content provided from the software application) by performing the operation 470.

As described above, the electronic device according to an embodiment may execute the software application and/or media content that has been set based on switching between the phone mode and the tablet mode. The electronic device may identify at least one software application and/or at least one media content to be executed in a mode of the electronic device to be entered by the switching based on the task list displayed while switching between the phone mode and the tablet mode. The electronic device may provide the software application and/or the media content based on the state of the software application and/or media content set by a user.

Hereinafter, an example of an electronic device performing the operation of FIG. 4 is described in greater detail below with reference to FIGS. 5A, 5B and 5C and/or FIGS. 6A, 6B and 6C.

Figure 5A:
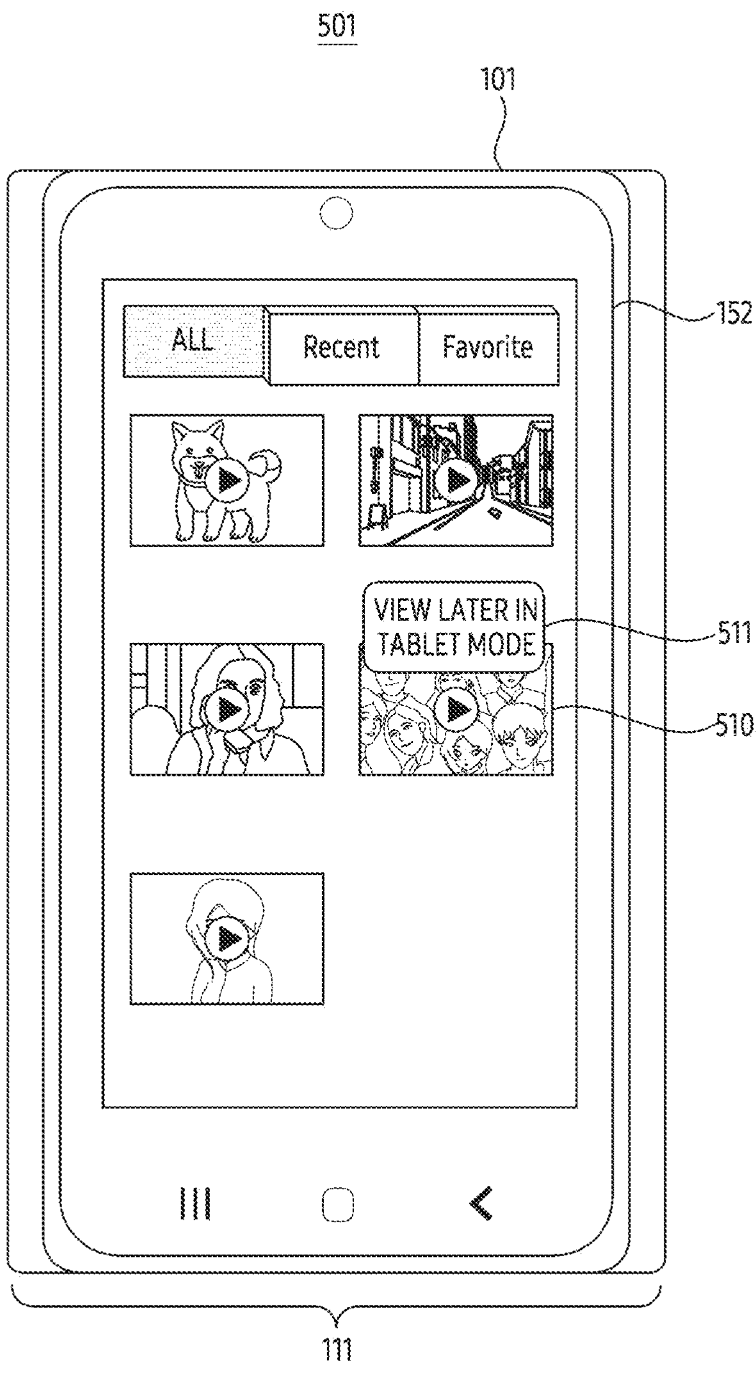
FIGS. 5A, 5B, and 5C are diagrams illustrating various different example states of an electronic device according to various embodiments.
Figure 5B:
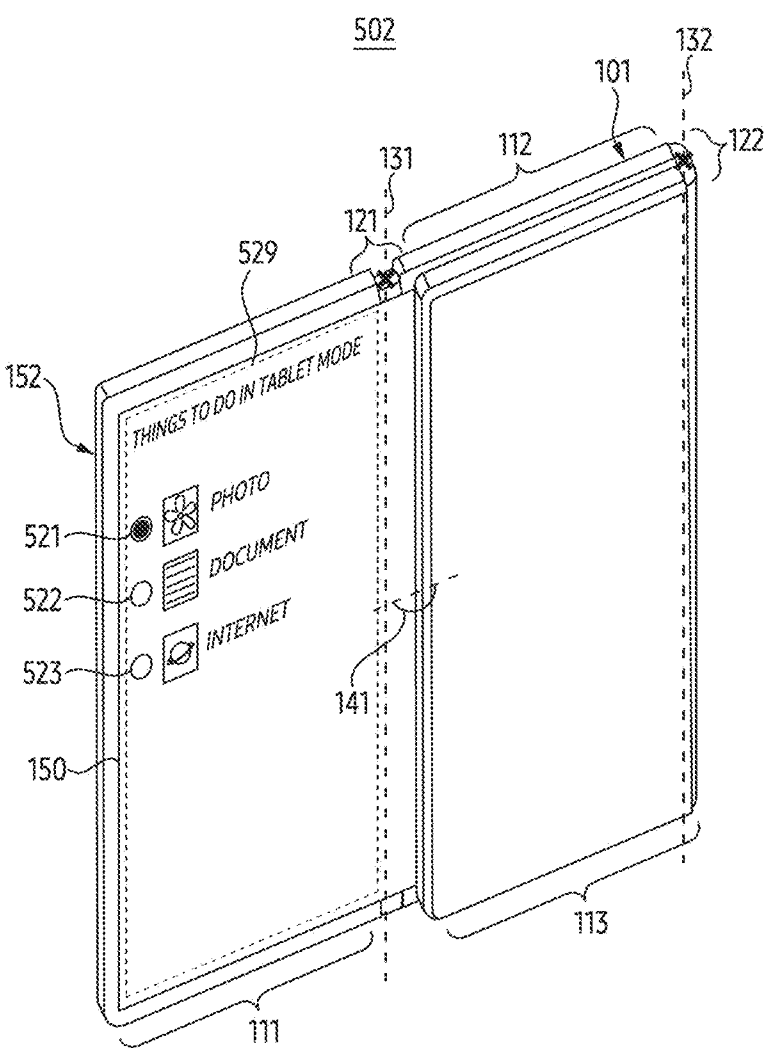
Figure 5C:
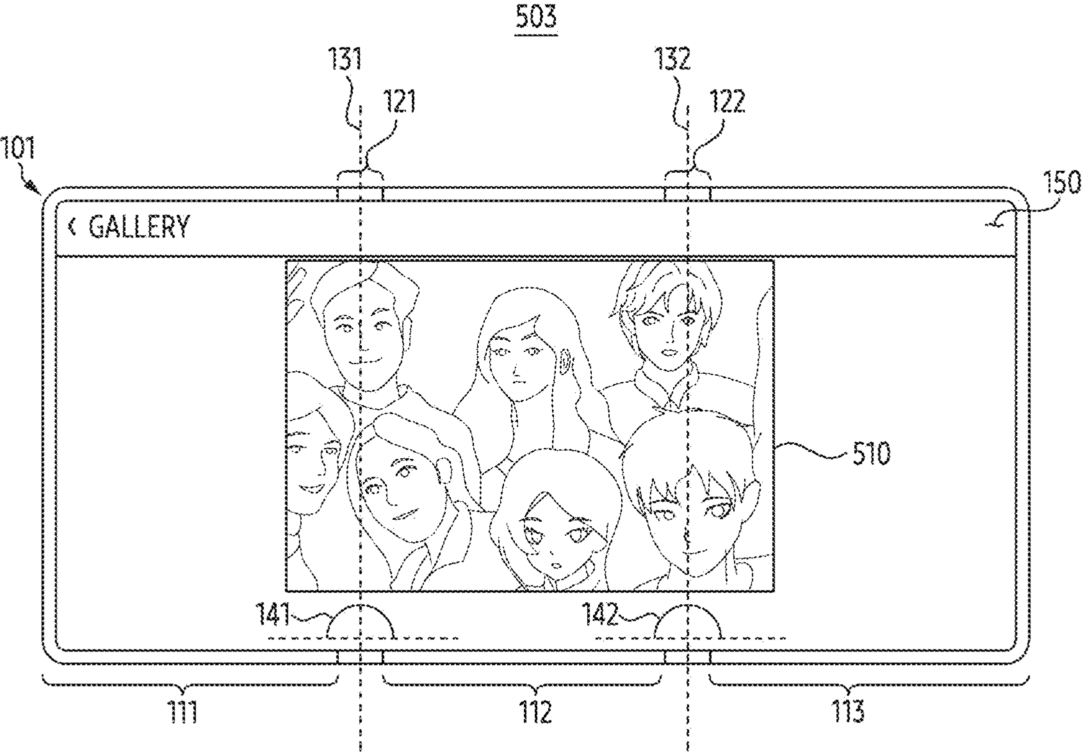

FIGS. 5A, 5B, and 5C are diagrams illustrating various different states 501, 502, and 503 of an electronic device 101 according to various embodiments. The electronic device 101 of FIGS. 1, 2, and 3A may perform an operation described with reference to FIGS. 5A, 5B, and 5C (which may be referred to as FIGS. 5A to 5C). The operation of the electronic device 101 of FIGS. 5A to 5C may be performed by an electronic device 101 of FIG. 2 and/or a processor 210 of FIG. 2.

Referring to FIGS. 5A to 5C, the states 501, 502, and 503 of the electronic device 101 distinguished by a posture of a first housing 111, a second housing 112, and a third housing 113 are illustrated. In the state 501 of FIG. 5A corresponding to a folded state, the electronic device 101 may display a screen based on a phone mode using a cover display 152. In the folded state, a first surface corresponding to a flexible display 150 on the first housing 111 and a second surface corresponding to the flexible display 150 on the second housing 112 may face each other, and the second surface and a third surface corresponding to the flexible display 150 on the third housing 113 may face each other. Referring to FIG. 5A, according to an embodiment, the example state 501 displaying a screen provided by a software application for viewing media content (e.g., an image, photo, and/or video) stored in the electronic device 101, such as a gallery application, is illustrated. In the state 501, the electronic device 101 may display a list of a plurality of media contents including a photo 510 on the cover display 152.

In the state 501 of FIG. 5A, the electronic device 101 may identify or receive an input for designating media content and/or software application to be provided in a mode (e.g., the tablet mode) different from the current mode (e.g., the phone mode). For example, the electronic device 101 may display a menu 511 associated with the photo 510 on the cover display 152 in response to a long touch gesture with respect to the photo 510. The input for displaying the menu 511 is not limited to the long touch gesture and may include another gesture such as a double tap gesture. The menu 511 may include an option for providing the photo 510 in a mode different from the current mode. The electronic device 101 may display text (e.g., "view later in tablet mode") for describing the option in the menu 511. In response to the input associated with the menu 511 and/or the option, the electronic device 101 may store information associated with the photo 510 in a queue (e.g., the second queue 242 of FIG. 2) corresponding to a mode (e.g., the tablet mode) different from the current mode. The input may be inputted by a user's intention to display the photo 510 on a wider screen using the tablet mode.

From the state 501 included in the folded state of FIG. 5A, the state of the electronic device 101 may be switched to a sub-folded state based on rotation of the first housing 111. Referring to FIG. 5B, the state 502 after the state 501 is illustrated. The electronic device 101, which senses (or detects) the rotation of the first housing 111, may confirm switching from the state 501 to the state 502. Referring to FIG. 5B, directions of the first surface of the flexible display 150 positioned on the first housing 111 and the second surface of the flexible display 150 positioned on the second housing 112 may be the same, and a direction of the second surface and the third surface of the flexible display 150 positioned on the third housing 113 may be opposite to each other.

Referring to FIG. 5B, the state 502 included in the sub-folded state is illustrated. In the folded state in which the cover display 152 is enabled, the electronic device 101 may disable the flexible display 150 different from the activated cover display 152. Based on switching from the folded state to the sub-folded state and/or an unfolded state, the electronic device 101 may disable the cover display 152 and/or may enable at least a portion of the flexible display 150. Enabling the flexible display 150 by the electronic device 101 may include an operation of enabling at least a portion of the flexible display 150 (e.g., a portion 529 of the flexible display 150 visible to the outside) and disabling another portion. In the folded state 501, the electronic device 101 may display a screen provided from one or more software applications on the cover display 152.

According to an embodiment, in the state 502 in which at least a portion of the flexible display 150 is outspread, a first angle 141 between the first housing 111, a first folding axis 131, and the second housing 112 may substantially correspond to 180°. In the state 502, a second angle between the second housing 112, a second folding axis 132, and the third housing 113 may substantially correspond to 0°. For example, in the state 502, a portion of the flexible display 150 positioned on the first housing 111 may be visible to the outside, and another portion of at least a portion of the flexible display 150 positioned on the second housing 112 and the third housing 113 may be covered. In the state 502, a portion of the flexible display 150 positioned on the second housing 112 and the other portion of the flexible display 150 positioned on the third housing 113 may face each other. Based on the rotation of the first housing 111, the state 502 in which only a portion of the flexible display 150 positioned on the first housing 111 is visible to the outside may be referred to as a half-folded (or half-folding) state.

According to an embodiment, in the half-fold state and/or the sub-folded state including the state 502, switched from the state 501 in the phone mode, the electronic device 101 may provide a list of one or more software applications to be executed based on the tablet mode to at least a portion of the flexible display 150 positioned on the first housing 111. According to an embodiment, the list may be provided with a visual object (e.g., visual objects 521, 522, and 523) for receiving an input for selecting a software application and/or media content to be executed in the tablet mode.

Referring to the example state 502 of FIG. 5B, the electronic device 101 may display a list of the software application and/or media content set in the phone mode on the flexible display 150. Based on switching from the state 501 to the state 502, the electronic device 101 may disable the cover display 152, and may enable at least a portion of the flexible display 150 visible to the outside. According to an embodiment, on the enabled at least a portion of the flexible display 150, the electronic device 101 may display a list based on the first queue 241 and/or the second queue 242 of FIG. 2. For example, while switching from a state associated with the phone mode (e.g., the state 191 of FIG. 1) to a state associated with the tablet mode (e.g., the state 192 of FIG. 1), the electronic device 101 may display the list based on the second queue 242. For example, while switching from the state associated with the tablet mode (e.g., the state 192 of FIG. 1) to the state associated with the phone mode (e.g., the state 191 of FIG. 1), the electronic device 101 may display the list based on the first queue 241.

For example, the electronic device 101 may display a list including a photo, a document, and/or an Internet web page. While displaying the list including a plurality of items, the electronic device 101 may display visual objects 521, 522, and 523 corresponding to each of the plurality of items. The visual objects 521, 522, and 523 may have the form of a radio button and/or a check box. The electronic device 101 may identify at least one software application and/or media content to be executed in the tablet mode, based on an input with respect to the visual objects 521, 522, and 523. Referring to FIG. 5B, the electronic device 101 may receive an input for displaying media content (e.g., the photo 510) corresponding to the visual object 521 in the tablet mode through the visual object 521. The electronic device 101 that receives the input may set a state of the visual object 521 to a first designated state (e.g., in case of displaying the visual object 521 in the form of the radio button, a circle of a designated color is displayed inside the radio button) indicating selection of media content. Referring to FIG. 5B, the electronic device 101 may display the visual object 521 in the first designated state, and may display the visual objects 522 and 523 based on a second designated state different from the first designated state. The second designated state may be a state for indicating that media content is not selected. In case of displaying the visual object 522 in the form of the radio button, in the second designated state, the electronic device 101 may display the visual object 522 that does not include the circle of the designated color included in the radio button in the first designated state.

From the state 502 included in the sub-folded state and/or the half-folded state of FIG. 5B, the state of the electronic device 101 may be switched to the unfolded state based on rotation of the third housing 113. Referring to FIG. 5C, the state 503 after the state 502 is illustrated. According to an embodiment, the electronic device 101 that senses (or detects) the rotation of the third housing 113 may confirm switching from the state 502 to the state 503. Referring to FIG. 5C, the state 503 included in the unfolded state is illustrated. According to an embodiment, the electronic device 101 may display a screen based on the unfolded state and/or the tablet mode, based on identifying that a direction of the first surface on the first housing 111 (e.g., the direction d1 of FIGS. 3A and/or 3B), a direction of the second surface on the second housing 112 (e.g., the direction d2 of FIGS. 3A and/or 3B), and a direction of the third surface on the third housing 113 (e.g., the direction d3 of FIGS. 3A and/or 3B), on which the flexible display 150 is positioned, are the same.

According to an embodiment, in response to switching from the sub-folded state (e.g., the state 502) to the unfolded state (e.g., the state 503 of FIG. 5C) based on the rotation of the third housing 113, the electronic device 101 may display a screen associated with one or more software applications associated with the list provided in the sub-folded state on the flexible display 150. According to an embodiment, after receiving an input based on the visual object 521 of FIG. 5B, the electronic device 101 may display a screen including the photo 510 corresponding to the input based on switching to the state 503 associated with the tablet mode. In the state 503, the processor may display the screen including the photo 510 using the entire active region of the flexible display 150 based on the tablet mode.

Although a case sequentially switching from the state 501 in the folded state of FIG. 5A to the state 503 in the unfolded state of FIG. 5C has been described, the disclosure is not limited thereto. For example, the electronic device 101 may receive an input for designating a software application and/or media content to be executed in the phone mode in the state 503 associated with the tablet mode. After receiving the input, in case of switching from the state 503 to the state 502, the electronic device 101 may display a list of the software application and/or media content based on the input based on the sub-folded state and/or the half-folded state. In case of switching from the state 502 to the state 501, the electronic device 101 may display at least one software application and/or the at least one media content selected from the list on the cover display 152. The disclosure is not limited thereto, and the state of the electronic device 101 may switch between the folded state and the unfolded state, without the sub-folded state and/or the half-folded state. An example of the electronic device 101 switching between the folded state and the unfolded state, without the sub-folded state and/or the half-folded state, is described in greater detail below with reference to FIGS. 7 and/or 8.

As described above, while executing a software application and/or media content based on the phone mode (e.g., the state 501), the electronic device 101 according to an embodiment may receive an input for designating the software application and/or media content to be executed based on a relatively wide screen. Based on the input, the electronic device 101 may generate a list of the software application and/or media content to be executed in the tablet mode while maintaining the phone mode. Similarly, the electronic device 101 may manage a list of the software application and/or media content to be executed in the phone mode while maintaining the tablet mode.

Figure 6A:
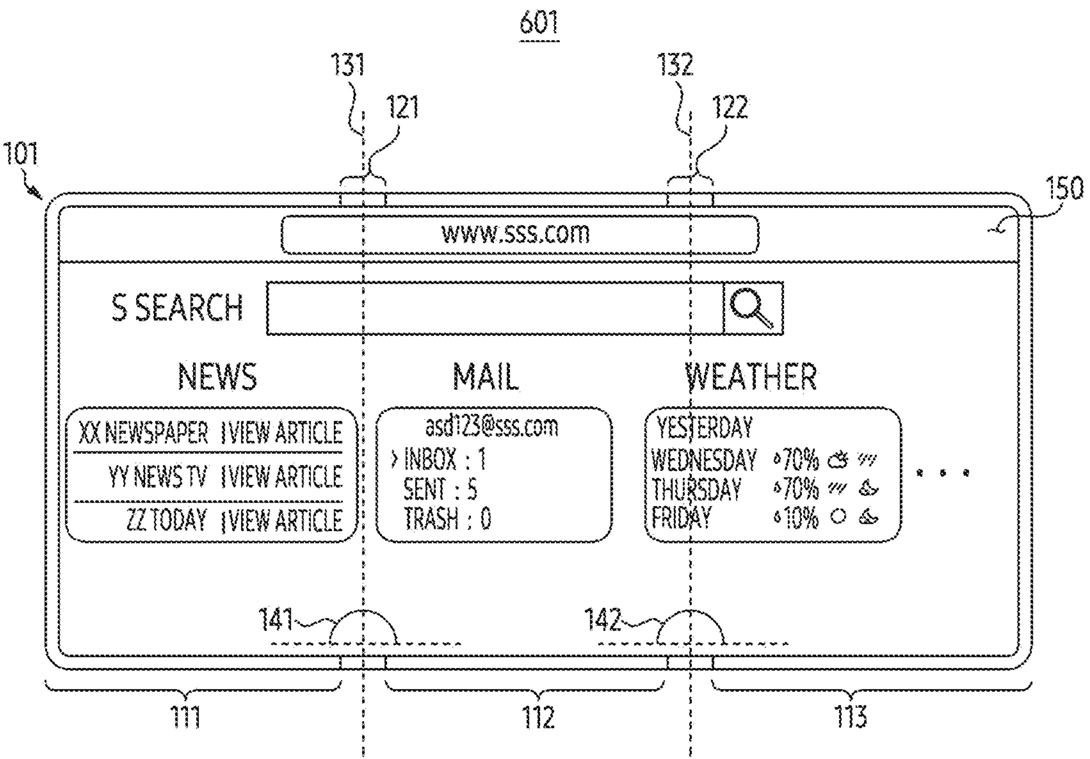
FIGS. 6A, 6B, and 6C are diagrams illustrating various different example states of an electronic device according to various embodiments.
Figure 6B:
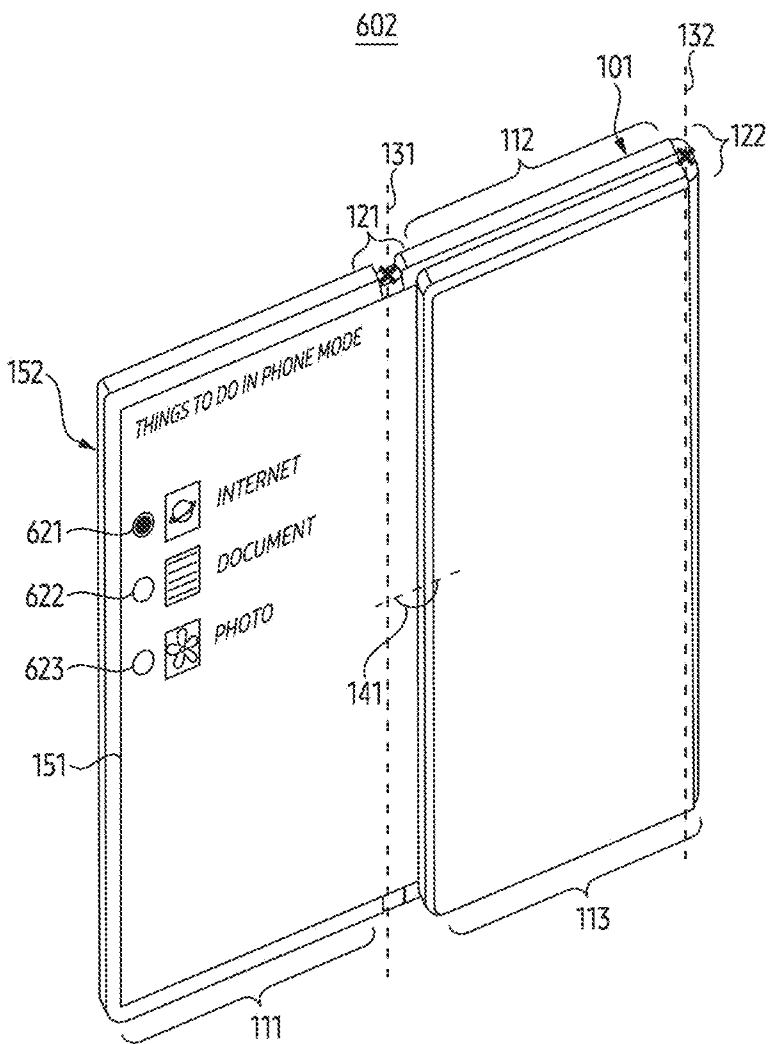
Figure 6C:
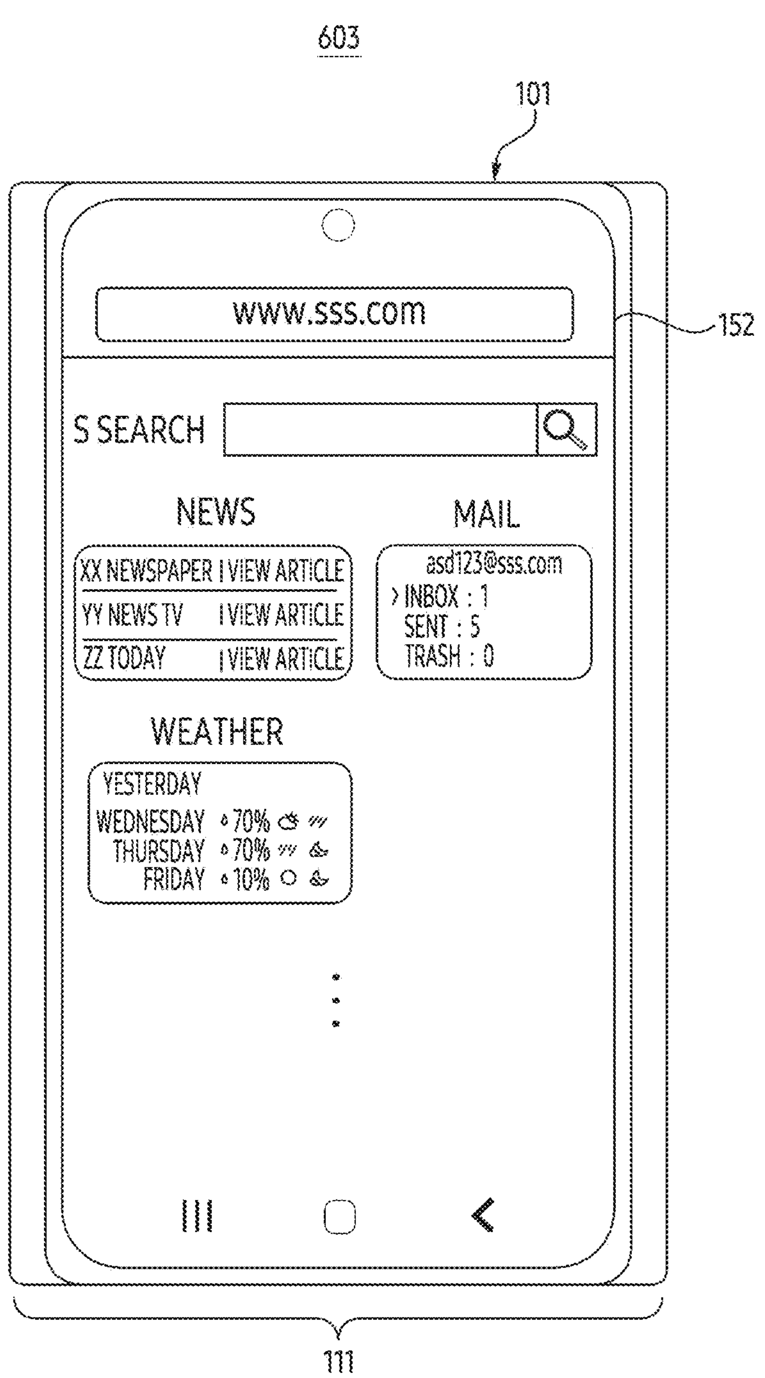

FIGS. 6A, 6B, and 6C are diagrams illustrating various different example states 601, 602, and 603 of an electronic device 101 according to various embodiments. The electronic device 101 of FIGS. 1, 2, and 3A may perform an operation described with reference to FIGS. 6A, 6B, and 6C (which may be referred to as FIGS. 6A to 6C). The operation of the electronic device 101 of FIGS. 6A to 6C may be performed by an electronic device 101 of FIG. 2 and/or a processor 210 of FIG. 2.

Referring to FIGS. 6A to 6C, states 601, 602, and 603 of the electronic device 101 distinguished by a posture of a first housing 111, a second housing 112, and a third housing 113 are illustrated. In the state 601 of FIG. 6A associated with an unfolded state, the electronic device 101 may display a screen based on a tablet mode on a flexible display 150. In the unfolded state, directions (e.g., the directions d1, d2, and d3 of FIGS. 3A and/or 3B) of portions (e.g., the front surface of the electronic device) of the flexible display 150 positioned in each of the first housing 111, the second housing 112, and the third housing 113 may be substantially parallel to each other. Referring to FIG. 6A, the example state 601 that displays a screen provided from a software application for viewing a web page, such as a web browser, is illustrated. In the state 601, the electronic device 101 may display at least a portion of the web page on at least a portion of the flexible display 150 based on execution of the web browser.

In the state 601 of FIG. 6A, the electronic device 101 may identify or receive an input for designating media content and/or software application to be provided in a mode (e.g., the phone mode) different from the current mode (e.g., the tablet mode). For example, in response to a long touch gesture with respect to a web page displayed in the state 601, the electronic device 101 may display a menu and/or a visual object for confirming whether to provide the web page in the phone mode. For example, the electronic device 101 detecting the long touch gesture that touches a portion where the web page is displayed for more than a designated period (e.g., about 1.5 seconds), may display a menu and/or a visual object for confirming whether to provide the web page in a mode different from the current mode. In response to an input associated with the menu and/or the visual object, the electronic device 101 may store information associated with the web page displayed in the state 601 in a queue (e.g., the first queue 241 of FIG. 2) corresponding to a mode (e.g., the phone mode) different from the current mode. The information may include a URL of the web page and data indicating a location (or portion) of the web page displayed in the state 601. For example, the information may include text in which the URL and the data are combined (e.g., text combined by a delimiter such as "#").

For example, the electronic device 101 may display a web page including text and/or an image for connection and/or switching between web pages, such as a hyperlink. In response to the long touch gesture associated with the hyperlink, the electronic device 101 may store a web page corresponding to the hyperlink (e.g., another web page connected to the web page displayed on the flexible display 150 in the state 601) in a queue corresponding to a mode different from the current mode. Information stored in the queue may include a URL of the web page corresponding to the hyperlink.

According to an embodiment, from the state 601 associated with the unfolded state, the state of the electronic device 101 may be switched to a sub-folded state and/or a half-folded state based on rotation of the third housing 113. Referring to FIG. 6B, the state 602 of the electronic device 101 switched from the state 601 by the rotation of the third housing 113 with respect to the second housing 112 is illustrated. The electronic device 101, which senses the rotation of the third housing 113, may confirm switching to the state 602. The state 602 of FIG. 6B may be associated with the state 502 of FIG. 5B.

Referring to FIG. 6B, in the example state 602 included in the sub-folded state and/or the half-folded state, the electronic device 101 may partially enable the flexible display 150 positioned on the first housing 111. On the portion of the flexible display 150 that is enabled, the electronic device 101 may provide a list of a software application and/or media content to be executed based on the phone mode. The disclosure is not limited thereto, and the electronic device 101 may enable the entire active region of the flexible display 150 and then display the list on a portion of the active region. The list may be visualized based on a task list corresponding to the phone mode and/or information stored in the first queue 241 of FIG. 2. In the list, the electronic device 101 may display at least one visual object (e.g., the visual objects 621, 622, and 623) for receiving an input for selecting a software application and/or media content to be provided through the phone mode. Based on the list, the electronic device 101 may receive an input for selecting at least one of the software applications and/or media content included in the list.

Referring to FIG. 6B, a list including the visual objects 621, 622, and 623 in a form of a radio button and/or a check box is illustrated. The list may be displayed through a notification panel and/or a setting application as well as the sub-folded state and/or the half-folded state. For example, in the state 601 associated with the unfolded state, the electronic device 101 may visualize or display the list of FIG. 6B based on a gesture for displaying the notification panel (e.g., a swipe gesture moving along a vertical direction at the top of the flexible display 150). For example, based on the gesture, the electronic device 101 may display the notification panel in which the list and one or more notification messages are accumulated. Using the list displayed in the unfolded state, the electronic device 101 may receive an input for editing a software application and/or media content to be executed in a state (e.g., the folded state associated with the phone mode) different from the unfolded state.

From the state 602 associated with the sub-folded state and/or the half-folded state of FIG. 6B, the state of the electronic device 101 may be switched to a folded state based on rotation of the first housing 111. Referring to FIG. 6C, the state 603 after the state 602 is illustrated. According to an embodiment, the electronic device 101, which senses the rotation of the first housing 111 with respect to the second housing 112, may confirm switching from the state 602 to the state 603. Referring to FIG. 6C, the state 603 included in the folded state is illustrated. The electronic device 101 may display a screen on the cover display 152 based on the phone mode in the folded state.

According to an embodiment, based on switching from the sub-folded state (e.g., the state 602 of FIG. 6B) to the folded state (e.g., the state 603 of FIG. 6C), the electronic device 101 may display a software application and/or media content associated with the list provided in the sub-folded state on the cover display 152. For example, in the state 603 after receiving an input associated with the visual object 621 of FIG. 6B, the electronic device 101 may display a screen including a web page on the cover display 152 by executing a web browser corresponding to the visual object 621. The web page displayed on the cover display 152 in the state 603 of FIG. 6C may correspond to the web page that was displayed on the flexible display 150 in the state 601 of FIG. 6A. For example, the electronic device 101 may display at least a portion of the web page that was displayed in the state 601 of FIG. 6A on the cover display 152 in the state 603 of FIG. 6C. Since a size of the cover display 152 is smaller than the flexible display 150, a first portion of the web page displayed on the cover display 152 in the state 603 may be included in a second portion of the web page that was displayed on the flexible display 150 in the state 601. In an embodiment in which a first resolution of the cover display 152 and a second resolution of the flexible display 150 are different, the electronic device 101 switched from the state 601 of FIG. 6A to the state 603 of FIG. 6C may change the web page that was displayed based on the second resolution in the state 601 of FIG. 6A based on the first resolution. The electronic device 101 may display the changed web page based on the first resolution on the cover display 152.

Although an example providing a software application and/or media content based on an input received in the sub-folded state and/or the half-folded state has been described, the disclosure is not limited thereto. The electronic device 101 may automatically select a software application and/or media content to be executed in a list based on a setting value set by the setting application. For example, the setting value may include a value indicating whether to automatically select the software application and/or media content added last to the list.

Although an example based on the web browser has been described, the disclosure is not limited thereto. In case that at least one of an email application, a document application, and/or a spreadsheet application is selected, the electronic device 101 may display a screen provided from the selected software application on the cover display 152. For example, in case that the document application is selected, the electronic device 101 may execute the document application and load at least one file to be displayed through the document application. The list managed by the electronic device 101 may include the at least one file and/or a file path of the at least one file.

Figure 7:
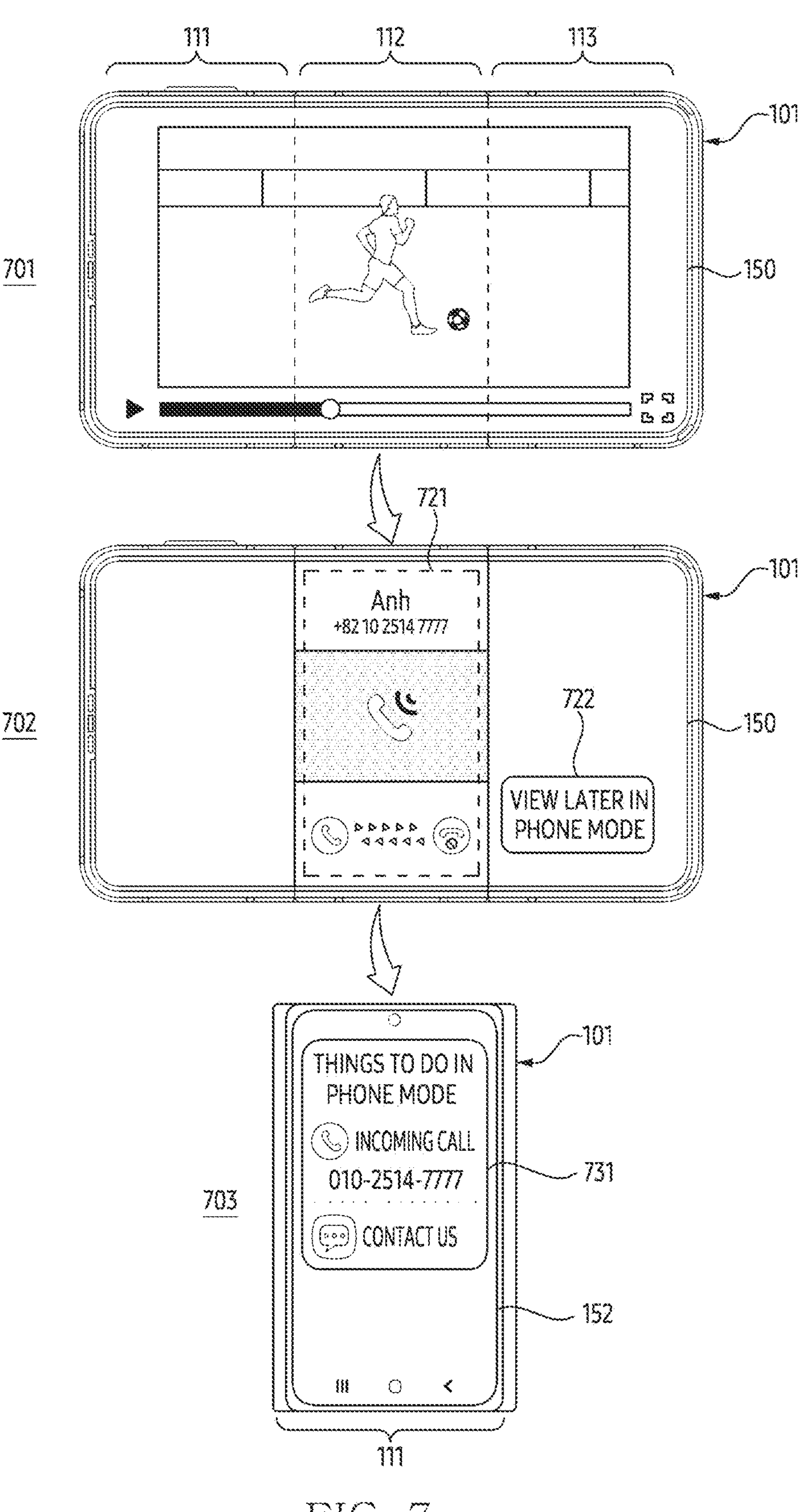
FIG. 7 is a diagram illustrating various different example states of an electronic device according to various embodiments.

FIG. 7 is a diagram illustrating various different example states 701, 702, and 703 of an electronic device 101 according to various embodiments. The electronic device 101 of FIGS. 1, 2, and 3A may perform an operation described with reference to FIG. 7. The operation of the electronic device 101 of FIG. 7 may be performed by an electronic device 101 of FIG. 2 and/or a processor 210 of FIG. 2.

Referring to FIG. 7, the different states 701, 702, and 703 of the electronic device 101 are illustrated. In the state 701 associated with an unfolded state, the electronic device 101 may identify the unfolded state of the electronic device 101, which is confirmed by a sensor (e.g., the sensor 230 of FIG. 2) and distinguished by a posture of a first housing 111, a second housing 112, and a third housing 113. In the unfolded state, the electronic device 101 may execute one or more software applications based on a flexible display 150. For example, in the unfolded state in which a cover display 152 is disabled, the electronic device 101 may display a screen based on the one or more software applications on the enabled flexible display 150. The screen provided from the one or more software applications may have a layout that utilizes the entire active region of the flexible display 150 based on a tablet mode.

Referring to FIG. 7, in the state 701 associated with the unfolded state, the electronic device 101 may receive a signal for a call connection. Based on receiving the signal, the electronic device 101 may switch from the state 701 to the state 702 of FIG. 7. In the state 702, the electronic device 101 may display a screen 721 provided from a call application by executing the call application associated with the call connection. The screen 721 may include a visual object (e.g., an icon and/or a button for a call connection) for identifying whether to establish a call based on the signal for the call connection. In the screen, the electronic device 101 may display an option for establishing the call connection in a phone mode different from the tablet mode. The option may be displayed on the flexible display 150 based on a visual object 722 having a shape of a button.

According to an embodiment, in response to an input associated with the visual object 722, the electronic device 101 may store the call connection and/or call application in a list (e.g., the first queue 241 of FIG. 2) of a software application and/or media content to be executed in the phone mode. In response to an input indicating selection of the visual object 722, the electronic device 101 may at least temporarily stop establishing the call connection.

According to an embodiment, after receiving the input with respect to the visual object 722, based on rotation of the first housing 111 and/or the third housing 113, the state of the electronic device 101 may be switched from the unfolded state to a sub-folded state and/or a folded state. In response to switching to the folded state, the electronic device 101 may disable the flexible display 150 and enable the cover display 152. The electronic device 101 may control the enabled cover display 152 based on one or more software applications. Referring to FIG. 7, after switching to the state 703 corresponding to the folded state, the electronic device 101 may display a list of a software application and/or media content reserved to be provided in the phone mode on the cover display 152. The list may have a form of a visual object displayed on at least a portion of the cover display 152, such as a panel 731. In the panel 731, the electronic device 101 may display an option associated with the call connection that is reserved based on the visual object 722.

Based on an input associated with the option, the electronic device 101 may establish the call connection.

Figure 8:
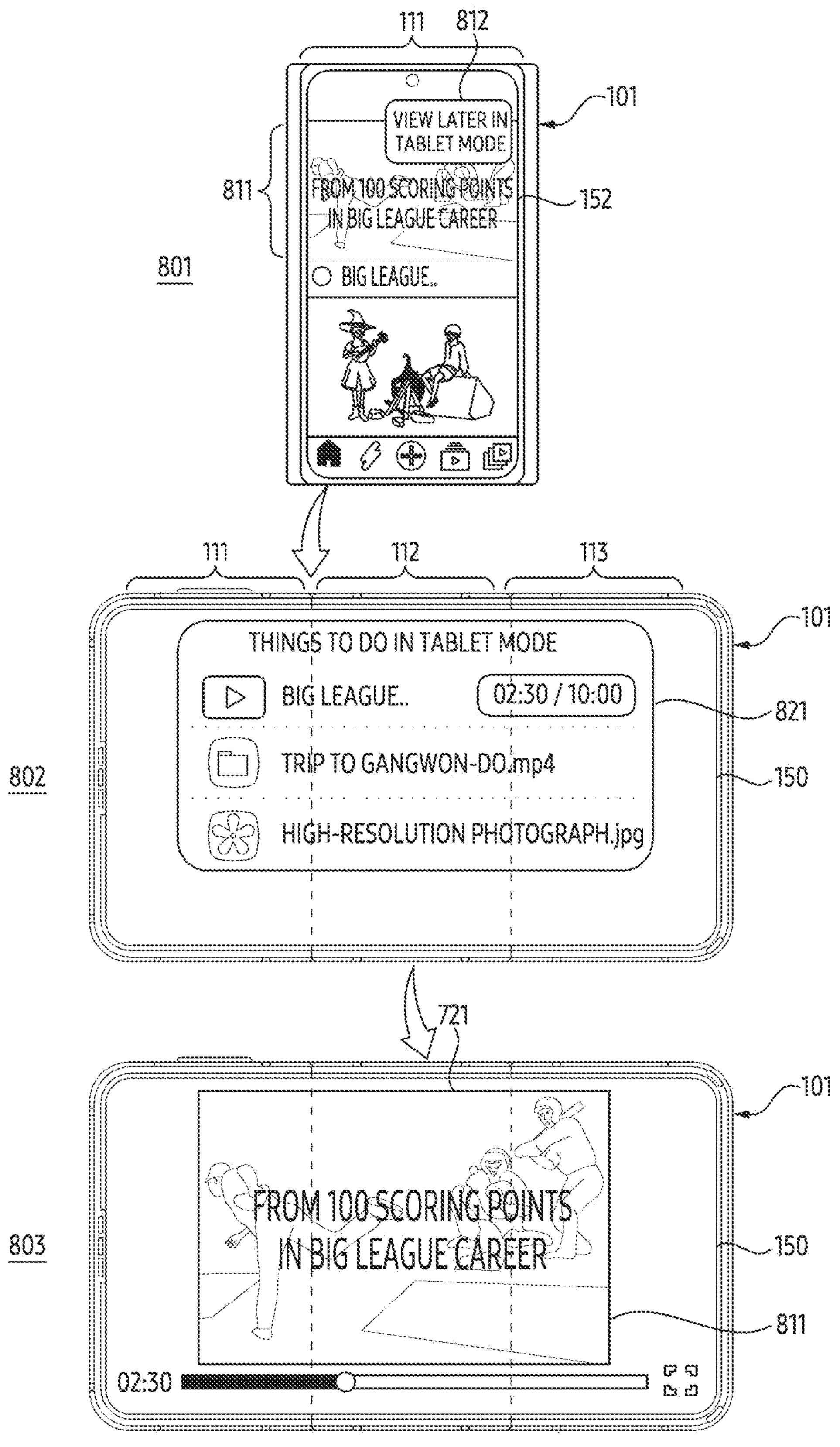
FIG. 8 is a diagram illustrating various different example states of an electronic device according to various embodiments.

FIG. 8 is a diagram illustrating various different example states 801, 802, and 803 of an electronic device 101 according to various embodiments. The electronic device 101 of FIGS. 1, 2, and 3A may perform an operation described with reference to FIG. 8. The operation of the electronic device 101 of FIG. 8 may be performed by an electronic device 101 of FIG. 2 and/or a processor 210 of FIG. 2.

Referring to FIG. 8, the different states 801, 802, and 803 of the electronic device 101 are illustrated. In the state 801 associated with a folded state, the electronic device 101 may reproduce a video 811 using a cover display 152. On the cover display 152, the video 811 may be displayed based on a phone mode. In the state 801, the electronic device 101 may receive an input for reproducing the video 811 in a tablet mode, based on a menu 812 with respect to the video 811. Based on the input, the electronic device 101 may store information associated with the video 811 in a queue (e.g., the second queue 242 of FIG. 2) associated with the tablet mode. The information may include at least one of data for specifying the video 811 (e.g., file name, path, and/or title of the video 811) and/or data for continuously reproducing the video 811 (e.g., a timing of the video 811 that was being played at a timing of receiving the input).

Referring to FIG. 8, in the state 801 of reproducing the video 811, in response to switching to an unfolded state, the electronic device 101 may display a list with respect to a software application and/or media content to be executed based on the tablet mode corresponding to the unfolded state (e.g., the state 802). The electronic device 101 may visualize the list using a panel 821 displayed on at least a portion of a flexible display 150. Referring to FIG. 8, in case that the video 811 is added to the list, the electronic device 101 may display text indicating a time point at which the video 811 will be reproduced in the panel 821. For example, the electronic device 101 may display text indicating the entire length of the video 811 (10 minutes) and the time point at which the video 811 will be played (2 minutes and 30 seconds), such as "02:30/10:00". The disclosure is not limited thereto.

Referring to FIG. 8, in the state 803 in the unfolded state, the electronic device 101 may display the video 811 based on the tablet mode on the flexible display 150. The electronic device 101 may display the video 811 on the flexible display 150 based on the playback time point of the video 811 reproduced in the folded state.

Although an example of the electronic device 101 including the cover display 152 and the flexible display 150 has been described, the disclosure is not limited thereto. Hereinafter, an example operation of an electronic device 310 including the flexible display 150 of FIG. 3B is described in greater detail with reference to FIGS. 9A, 9B and 9C.

Figure 9A:
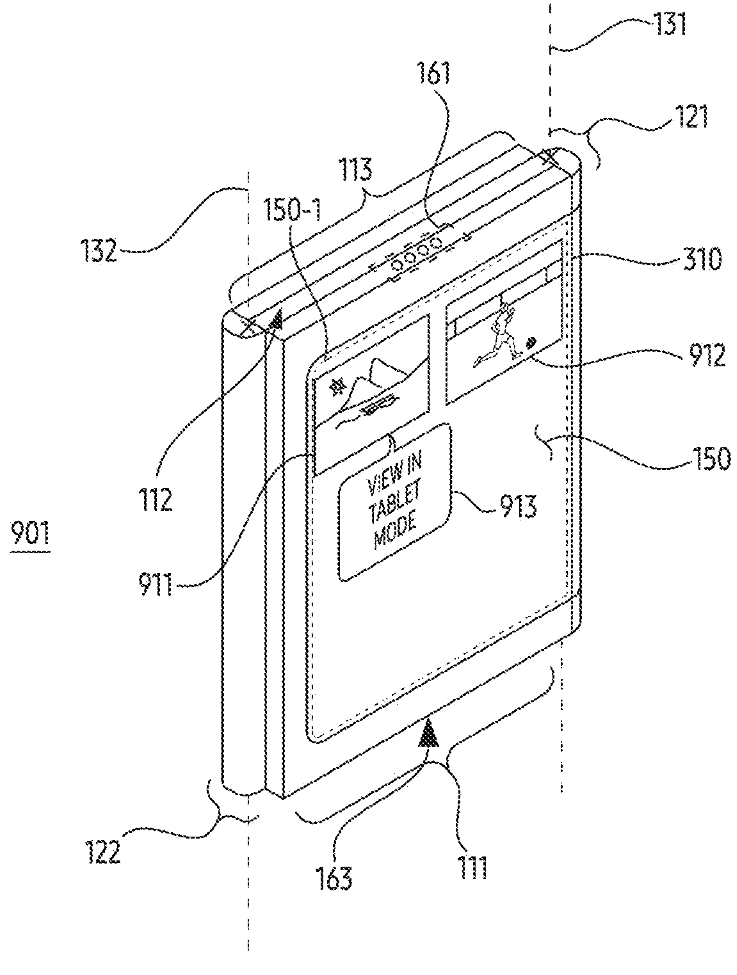
FIGS. 9A, 9B, and 9C are perspective views illustrating various different example states of an electronic device according to various embodiments.
Figure 9B:
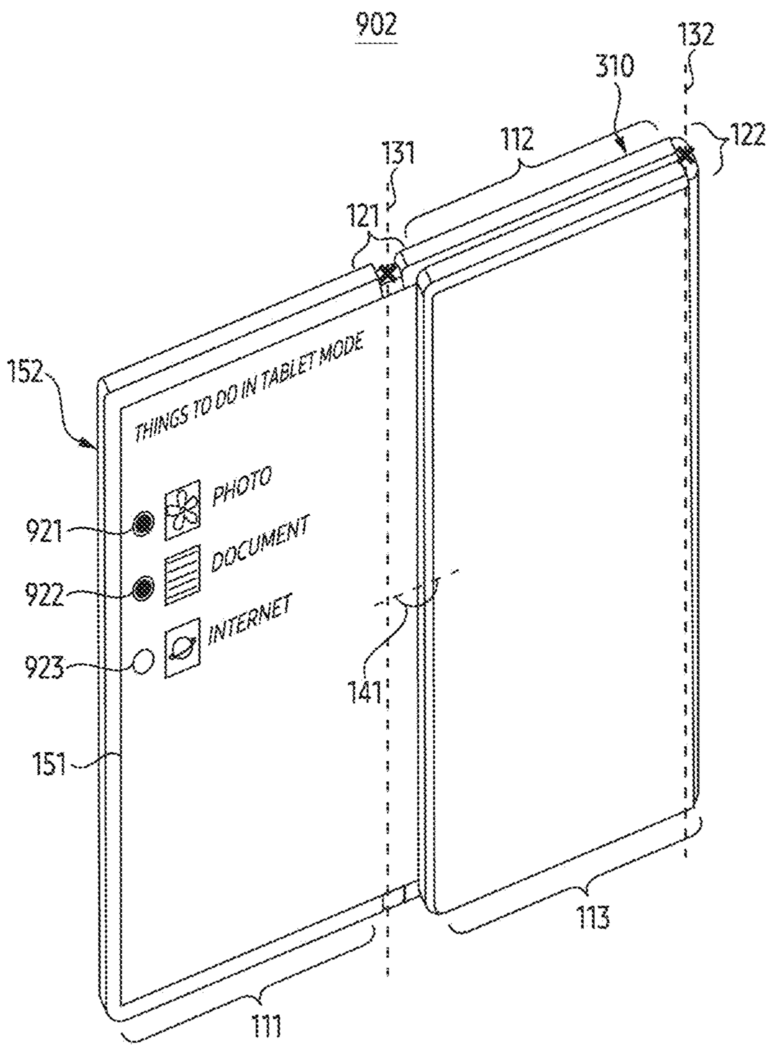
Figure 9C:
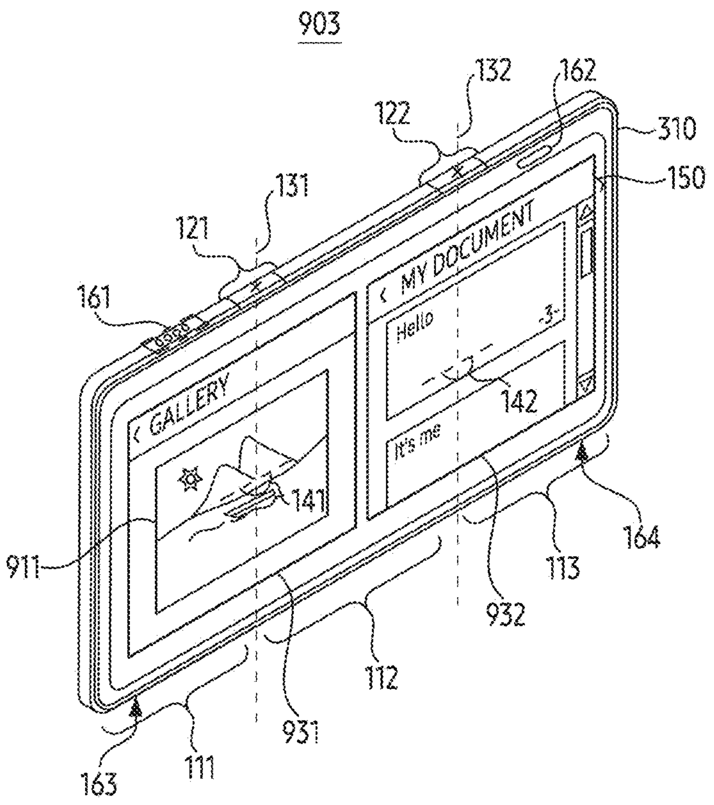

FIGS. 9A, 9B, and 9C are perspective views illustrating various different example states 901, 902, and 903 of an electronic device 310 according to various embodiments. The electronic device 310 of FIG. 3B may perform an operation described with reference to FIGS. 9A, 9B, and 9C (which may be referred to as FIGS. 9A to 9C). The operation of the electronic device 310 of FIGS. 9A to 9C may be performed by a processor 210 of FIG. 2.

Referring to FIG. 9A, the state 901 of the electronic device 310 associated with a folded state is illustrated. In the folded state, a first portion 150-1 of a flexible display 150 positioned on a first housing 111 may be visible to the outside, and a second portion (e.g., the second portion 150-2 of FIG. 3A) of the flexible display 150 positioned on a second housing 112 may face a third portion (e.g., the third portion 150-3 of FIG. 3A) of the flexible display 150 positioned on a third housing 113. In the state 901, the electronic device 310 may execute one or more software applications based on the first portion. In the state 901, the electronic device 310 may display a screen having a layout based on a phone mode on the first portion.

In the example state 901 of FIG. 9A, the electronic device 310 may display a screen for viewing media content including photos 911 and 912. The screen may be provided from a software application for viewing media content, such as a gallery application. According to an embodiment, in response to an input (e.g., the long touch gesture, a single tap gesture, a double touch gesture, and the like) to the photo 911, the electronic device 310 may receive an input set for providing the photo 911 in a tablet mode. The input may be identified based on a tap gesture with respect to a visual object 913 displayed in response to the input.

From the state 901 corresponding to the folded state of FIG. 9A, based on rotation of the first housing 111, the electronic device 310 may be switched to the state 902 corresponding to a sub-folded state and/or a half-folded state. Referring to FIG. 9B, in response to switching from the state 901 to the state 902, the electronic device 310 may provide a list of a software application and/or media content set (or reserved) to be executed in the tablet mode to the first portion of the flexible display 150 positioned on the first housing 111. In a screen including the list, the electronic device 310 may display visual objects 921, 922, and 923 corresponding to each of items (e.g., the software application and/or media content) included in the list. Similar to visual objects 521, 522, and 523 of FIG. 5B and/or visual objects 621, 622, and 623 of FIG. 6B, the electronic device 310 may receive an input for selecting at least one of the visual objects 921, 922, and 923. Based on the input, the electronic device 310 may identify a software application and/or media content to be executed in the tablet mode.

From the state 902 corresponding to the sub-folded state of FIG. 9B, based on rotation of the third housing 113, the electronic device 310 may be switched to the state 903 corresponding to the unfolded state. Referring to FIG. 9C, in response to switching from the state 902 to the state 903, the electronic device 310 may display screens 931 and 932 associated with one or more software applications specified by the list that was provided in the state 902 on the entire active region of the flexible display 150. For example, in case of switching from the state 902 in which an input indicating selection of the visual objects 921 and 922 is received to the state 903, the electronic device 310 may display the screens 931 and 932 corresponding to each of the software applications by executing software applications (e.g., the gallery application and/or document application) corresponding to each of the visual objects 921 and 922.

In the example state 903 of FIG. 9C, the electronic device 310 may display the screen 931 on the first portion of a display area of the flexible display 150, and may display the screen 932 on the second portion next to the first portion. The screens 931 and 932 may not overlap each other on the flexible display 150. The electronic device 310 may tile the screens 931 and 932 on the flexible display 150. Displaying the screens 931 and 932 on different portions of the flexible display 150 that do not overlap each other may be referred to as a picture-in-picture (PBP). The electronic device 310 may display the screens 931 and 932 provided from software applications that are substantially simultaneously executed based on multitasking on the flexible display 150.

As described above, the electronic device according to an embodiment may include a multi-foldable housing. Based on a posture of the multi-foldable housing, the electronic device may display a screen having a layout based on the phone mode and/or the tablet mode. In the current mode of the electronic device, which is determined among the phone mode or the tablet mode, the electronic device may support a function for setting (or a function for reserving) a software application and/or media content to be provided through a mode different from the current mode. Based on the function, the electronic device may provide one or more software applications and/or one or more media content after switching to the other mode.

Figure 10:
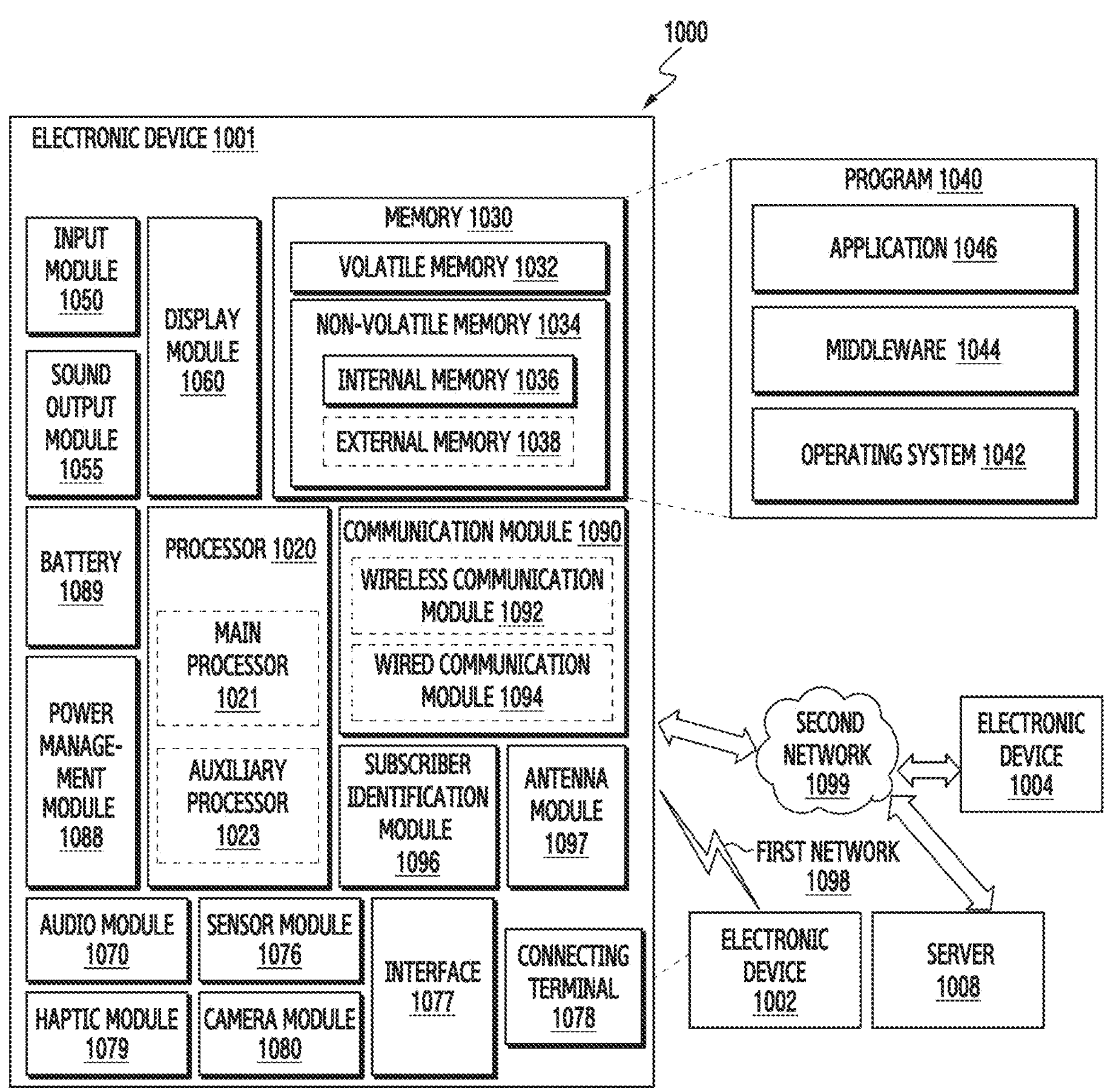
FIG. 10 is a block diagram illustrating an example electronic device in a network environment according to various embodiments.

FIG. 10 is a block diagram illustrating an example electronic device 1001 in a network environment 1000 according to various embodiments. Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In various embodiments, at least one of the components (e.g., the connecting terminal 1078) may be omitted from the electronic device 1001, or one or more other components may be added in the electronic device 1001. In various embodiments, some of the components (e.g., the sensor module 1076, the camera module 1080, or the antenna module 1097) may be implemented as a single component (e.g., the display module 1060).

The processor 1020 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mm Wave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 1064 dB or less) for implementing mMTC, or U-plane latency (e.g., 0.5 ms or less for each of downlink (DL) and uplink (UL), or a round trip of 10 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element including a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In an embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. The electronic device 1001 of FIG. 10 may be an example of an electronic device 101 of FIGS. 1 to 8 and/or an electronic device 310 described with reference to FIGS. 9A to 9C.

In an embodiment, a method for providing a software application and/or media content based on different states and/or modes of an electronic device may be required. As described above, an electronic device (e.g., the electronic device 101 of FIGS. 1 to 8 and/or the electronic device 1001 of FIG. 10) according to an example embodiment may comprise: a first housing (e.g., the first housing 111 of FIGS. 3A and/or 3B), a second housing (e.g., the second housing 112 of FIGS. 3A and/or 3B) rotatably coupled to the first housing, a third housing (e.g., the third housing 113 of FIGS. 3A and/or 3B) rotatably coupled to the second housing, a cover display (e.g., the cover display 152 of FIG. 1) positioned on a first surface of the first housing, a flexible display (e.g., the flexible display 150 of FIG. 1) including a first displaying region positioned on a second surface of the first housing opposite to the first surface and a second displaying region positioned on a third surface of the second housing and a third displaying region positioned on a fourth surface of the third housing, a first sensor configured to detect an angle between the first housing and the second housing, a second sensor configured to detect an angle between the second housing and the third housing, a memory (e.g., the memory 215 of FIG. 2) for storing instructions, and at least one processor, comprising processing circuitry (e.g., the processor 210 of FIG. 2), individually and/or collectively configured to execute the instructions. At least one processor, individually and/or collectively, may be configured to execute one or more applications on the cover display by the electronic device in a folded state. At least one processor, individually and/or collectively, may be configured to control the electronic device to display, in response to switching of the electronic device from the folded state to a half-folded state based on rotation of the first housing, a list of the one or more applications executed in the cover display of the first housing. At least one processor, individually and/or collectively, may be configured to control the electronic device to display, in response to switching of the electronic device from the half-folded state to an unfolded state based on rotation of the third housing, a screen associated with the at least one of the one or more applications on the flexible display.

For example, in the folded state, the first housing may be configured to be folded with respect to the second housing, and the third housing may be configured to be folded with respect to the second housing.

For example, in the half-folded state, the first housing may be configured to be unfolded with respect to the second housing and the third housing may be configured to be folded with respect to the second housing such that directions of the second surface and the third surface are identical to each other.

For example, in the unfolded state, the first housing may be configured to be unfolded with respect to the second housing and the third housing may be configured to be unfolded with respect to the second housing such that directions of the second surface, the third surface, and the fourth surface are the same as each other.

For control, in the folded state where the flexible display is disabled, the cover display enabled based on the one or more applications. At least one processor, individually and/or collectively, may be configured to disable the cover display and enable at least a portion of the flexible display positioned on the second surface in response to switching to the half-folded state from the folded state.

For example, at least one processor, individually and/or collectively, may be configured to control the electronic device to display, in the half-folded state, the list on a portion of the flexible display positioned on the second surface. At least one processor, individually and/or collectively, may be configured to control the electronic device to display, in the unfolded state, the screen in entire active region of the flexible display.

For example, at least one processor, individually and/or collectively, may be configured to control the electronic device to display, in response to switching to the unfolded state after reproducing a video using the cover display in the folded state, the video on the flexible display based on playback timing of the video which was reproduced in the folded state.

For example, at least one processor, individually and/or collectively, may be configured to control the electronic device to display, in response to switching to the unfolded state after displaying a portion of a web page using the cover display in the folded state, the portion of the web page which was displayed in the folded state on the flexible display.

For example, at least one processor, individually and/or collectively, may be configured to: receive, based on the list provided in the half-folded state, an input for selecting one of the one or more applications. At least one processor, individually and/or collectively, may be configured to control the electronic device to display, in response to switching to the unfolded state from the half-folded state after receiving the input, the screen associated with an application corresponding to the input on the flexible display.

For example, at least one processor, individually and/or collectively, may be configured to control the electronic device to display, based on receiving a swipe gesture with respect to a top area of the cover display in the folded state, a notification panel where the list and one or more notification messages are accumulated.

For example, at least one processor, individually and/or collectively, may be configured to execute, based on identifying the third surface and the fourth surface facing to each other and the second surface and the third surface facing to each other based on the one or more sensors, the one or more applications based on the folded state. At least one processor, individually and/or collectively, may be configured to provide, based on identifying the third surface and the fourth surface facing to each other and directions of the second surface and the third surface are identical to each other based on the one or more sensors, the list based on the half-folded state. At least one processor, individually and/or collectively, may be configured to control the electronic device to display, based on identifying directions of the second surface, the third surface, and the fourth surface are identical to each other based on the one or more sensors, the screen based on the unfolded state.

As described above, a method of an electronic device according to an example embodiment may comprise executing, in a folded state of the electronic device, one or more applications on a cover display positioned on a first surface of the first housing. The method may comprise displaying, in response to switching of the electronic device from the folded state to a half-folded state based on rotation of the first housing, a list of the one or more applications executed on the cover display on a first displaying region of a flexible display of the electronic device positioned on a second surface of the first housing opposite to the first surface. The method may comprise displaying, in response to switching of the electronic device from the half-folded state to an unfolded state based on rotation of the third housing, a screen associated with at least one of the one or more applications provided by the list on the flexible display positioned on the second surface, a third surface of the second housing, and a fourth surface of the third housing.

For example, the executing may comprise: controlling, in the folded state where the flexible display is disabled, the cover display enabled based on the one or more applications. The providing may comprise, in response to switching to the half-folded state from the folded state, disabling the cover display and enabling at least a portion of the flexible display positioned on the second surface.

For example, the providing may comprise displaying, in the half-folded state, the list on a portion of the flexible display positioned on the second surface. The displaying may comprise displaying, in the unfolded state, the screen in entire active region of the flexible display.

For example, the executing may comprise reproducing a video using the cover display in the folded state. The displaying may comprise displaying the video on the flexible display based on playback timing of the video which was reproduced in the folded state.

For example, the providing may comprise receiving an input for selecting one of the one or more applications based on the list. The displaying may comprise displaying the screen associated with an application corresponding to the input on the flexible display.

For example, the method may comprise displaying, based on receiving a swipe gesture with respect to a top area of the cover display in the folded state, a notification panel where the list and one or more notification messages are accumulated.

For example, the executing may comprise executing, based on identifying the third surface and the fourth surface facing to each other and the second surface and the third surface facing to each other based on the one or more sensors, the one or more applications based on the folded state. The providing may comprise providing, based on identifying the third surface and the fourth surface facing to each other and directions of the second surface and the third surface are identical to each other based on the one or more sensors, the list based on the half-folded state. The displaying may comprise displaying, based on identifying directions of the second surface, the third surface, and the fourth surface are identical to each other based on the one or more sensors, the screen based on the unfolded state.

As described above, an electronic device (e.g., the electronic device 101 of FIGS. 1 to 8 and/or the electronic device 1001 of FIG. 10) according to an example embodiment may comprise: a first housing (e.g., the first housing 111 of FIGS. 3A and/or 3B), a second housing (e.g., the second housing 112 of FIGS. 3A and/or 3B) rotatably coupled to the first housing, a third housing (e.g., the third housing 113 of FIGS. 3A and/or 3B) rotatably coupled to the second housing, a cover display (e.g., the cover display 152 of FIG. 1) positioned on a first surface of the first housing, a flexible display (e.g., the flexible display 150 of FIG. 1) positioned on a second surface of the first housing opposite to the first surface and a third surface of the second housing and a fourth surface of the third housing, one or more sensors (e.g., the sensor 230 of FIG. 2), a memory (e.g., the memory 215 of FIG. 2) storing instructions, and at least one processor, comprising processing circuitry (e.g., the processor 210 of FIG. 2), individually and/or collectively, configured to execute the instructions. At least one processor, individually and/or collectively, may be configured to: execute, in an unfolded state of the electronic device distinguished by a posture of the first housing, the second housing, and the third housing and verified by the one or more sensors, one or more software applications based on the flexible display. At least one processor, individually and/or collectively, may be configured to provide, in response to switching from the unfolded state to a sub-folded state of the electronic device based on rotation of the third housing, a list of the one or more software applications on the flexible display positioned on the second surface of the first housing. At least one processor, individually and/or collectively, may be configured to control the electronic device to display, in response to switching from the sub-folded state to a folded state of the electronic device based on rotation of the first housing, a screen associated with the one or more software applications provided by the list on the cover display.

For example, at least one processor, individually and/or collectively, may be configured to: control, in the unfolded state where the cover display is disabled, the flexible display enabled based on the one or more software applications. At least one processor, individually and/or collectively, may be configured to disable the flexible display and enable the cover display, in response to switching from the sub-folded state to the folded state.

For execute the one or more software applications using the entire active region of the flexible display in the unfolded state. At least one processor, individually and/or collectively, may be configured to control the electronic device to display, in the sub-folded state, the list on a portion of the flexible display positioned on the second surface.

For example, at least one processor, individually and/or collectively, may be configured to control the electronic device to display, in response to switching to the folded state after reproducing a video using the flexible display in the unfolded state, the video on the flexible display based on playback timing of the video which was reproduced in the unfolded state.

For example, at least one processor, individually and/or collectively, may be configured to control the electronic device to display, in response to switching to the folded state after displaying a first portion of a web page using the flexible display in the unfolded state, a second portion included in the first portion of the web page which was displayed in the unfolded state on the cover display.

As described above, a method of operating an electronic device according to an example embodiment may comprise executing, in an unfolded state of the electronic device distinguished by a posture of a first housing, a second housing, and a third housing of the electronic device and verified by one or more sensors of the electronic device, one or more software applications based on a flexible display of the electronic device. The method may comprise providing, in response to switching from the unfolded state to a sub-folded state of the electronic device based on rotation of the third housing, a list of the one or more software applications on the flexible display among a cover display positioned on a first surface of the first housing, and the flexible display positioned on a second surface of the first housing opposite to the first surface, a third surface of the second housing, and a fourth surface of the third housing. The method may comprise displaying, in response to switching from the sub-folded state to a folded state of the electronic device based on rotation of the first housing, a screen associated with the one or more software applications provided by the list on the cover display.

For example, the executing may comprise controlling, in the unfolded state where the cover display is disabled, the flexible display which is enabled based on the one or more software applications. The displaying may comprise, in response to switching from the sub-folded state to the folded state, disabling the flexible display and enabling the cover display.

For example, the executing may comprise executing the one or more software applications using the entire active region of the flexible display in the unfolded state. The providing may comprise displaying the list on a portion of the flexible display positioned on the second surface in the sub-folded state.

For example, the executing may comprise reproducing a video using the flexible display in the unfolded state. The displaying may comprise displaying the video on the flexible display based on playback time of the video which was reproduced in the unfolded state.

For example, the executing may comprise displaying a first portion of a web page using the flexible display in the unfolded state. The displaying may comprise displaying a second portion included in the first portion of the web page which was displayed in the unfolded state on the cover display.

As described above, an electronic device (e.g., the electronic device 101 of FIG. 2, the electronic device 310 of FIG. 3B and/or the electronic device 1001 of FIG. 10) according to an example embodiment may comprise: a first housing (e.g., the first housing 111 of FIG. 3B), a second housing (e.g., the second housing 112 of FIG. 3B) rotatably coupled to the first housing, a third housing (e.g., the third housing 113 of FIG. 3B) rotatably coupled to the second housing, a flexible display (e.g., the flexible display 150 of FIG. 3B) positioned on a first surface of the first housing, a second surface of the second housing, and a third surface of the third housing, one or more sensors (e.g., the sensor 230 of FIG. 2), a memory (e.g., the memory 215 of FIG. 2) for storing instructions, and at least one processor, comprising processing circuitry (e.g., the processor 210 of FIG. 2), individually and/or collectively configured to execute the instructions. At least one processor, individually and/or collectively, may be configured to: execute, while a second portion of the flexible display positioned on the second surface faces a third portion of the flexible display positioned on the third surface and a first portion of the flexible display positioned on the first surface is visible to the outside based on a folded state, one or more software applications based on the first portion. At least one processor, individually and/or collectively, may be configured to provide, in response to switching from the folded state to a sub-folded state of the electronic device based on rotation of the first housing, a list of the one or more software applications on the first surface. At least one processor, individually and/or collectively, may be configured to control the electronic device to display, in response to switching from the sub-folded state to an unfolded state of the electronic device based on rotation of the second housing, a screen associated with the one or more software applications provided by the list in the entire active region of the flexible display including the first surface.

For example, at least one processor, individually and/or collectively, may be configured to: execute, based on identifying directions of the first surface and the second surface opposite to each other and identifying the second surface and the third surface facing to each other based on the one or more sensors, the one or more software applications based on the folded state. At least one processor, individually and/or collectively, may be configured to provide, based on identifying the second surface and the third surface facing to each other and the first surface and the second surface are identical to each other based on the one or more sensors, the list based on the sub-folded state. At least one processor, individually and/or collectively, may be configured to control the electronic device to display, based on identifying directions of the first surface, the second surface, and the third surface are identical to each other based on the one or more sensors, the screen based on the unfolded state.

As described above, a method of operating an electronic device according to an example embodiment may comprise: executing, while a first portion of a flexible display positioned on a first surface of a first housing of the electronic device is visible to the outside, and a second portion of the flexible display positioned on a second surface of a second housing faces a third portion of the flexible display positioned on a third surface of a third housing based on a folded state of the electronic device, one or more software applications based on the first portion. The method may comprise providing, in response to switching from the folded state to a sub-folded state of the electronic device based on rotation of the first housing, a list of the one or more software applications on the first surface. The method may comprise displaying, in response to switching from the sub-folded state to an unfolded state of the electronic device based on rotation of the second housing, a screen associated with the one or more software applications provided by the list in entire active region of the flexible display including the first surface.

For example, the executing may comprise executing, based on identifying the first surface and the second surface opposite to each other and identifying the second surface and the third surface facing to each other based on the one or more sensors, the one or more software applications based on the folded state. The providing may comprise providing, based on identifying the second surface and the third surface facing to each other and the directions of the first surface and the second surface are identical to each other based on the one or more sensors, the list based on the sub-folded state. The displaying may comprise displaying, based on identifying directions of the first surface, the second surface, and the third surface are identical to each other based on the one or more sensors, the screen based on the unfolded state.

As described above, an electronic device (e.g., the electronic device 101 of FIG. 2, the electronic device 310 of FIG. 3B and/or the electronic device 1001 of FIG. 10) according to an example embodiment may comprise: a first housing (e.g., the first housing 111 of FIG. 3B), a second housing (e.g., the second housing 112 of FIG. 3B) rotatably coupled to the first housing, a third housing (e.g., the third housing 113 of FIG. 3B) rotatably coupled to the second housing, a flexible display (e.g., the flexible display 150 of FIG. 3B) positioned on a first surface of the first housing, a second surface of the second housing, and a third surface of the third housing, one or more sensors (e.g., the sensor 230 of FIG. 2), a memory (e.g., the memory 215 of FIG. 2) for storing instructions, and at least one processor, comprising processing circuitry (e.g., the processor 210 of FIG. 2), individually and/or collectively, configured to execute the instructions. At least one processor, individually and/or collectively, may be configured to: execute, in an unfolded state of the electronic device, one or more software applications based on entire active region of the flexible display. At least one processor, individually and/or collectively, may be configured to provide, in response to switching from the unfolded state to a sub-folded state of the electronic device based on rotation of the third housing, a list of the one or more software applications on a portion of the flexible display positioned on the first surface. At least one processor, individually and/or collectively, may be configured to control the electronic device to display, in response to switching from the sub-folded state to a folded state of the electronic device based on rotation of the first housing, a screen associated with the one or more software applications provided by the list on the portion of the flexible display.

As described above, a method of an electronic device according to an example embodiment may comprise executing, in an unfolded state of the electronic device, one or more software applications based on entire active region of a flexible display positioned on a first surface of a first housing, a second surface of a second housing, and a third surface of a third housing of the electronic device. The method may comprise providing, in response to switching from the unfolded state to a sub-folded state of the electronic device based on rotation of the third housing, a list of the one or more software applications on a portion of the flexible display positioned on the first surface. The method may comprise displaying, in response to switching from the sub-folded state to a folded state of the electronic device based on rotation of the first housing, a screen associated with the one or more software applications provided by the list on the portion of the flexible display.

As described above, a foldable electronic device according to an example embodiment may comprise: a housing including a first housing part, a second housing part rotatably coupled to the first housing part, and a third housing part rotatably coupled to the second housing part, a flexible display including a first display area disposed on the first housing part, a second display area disposed on the second housing part, and a third display area disposed on the third housing part, at least one sensor configured to sense a first angle between the first housing part and the second housing part, and a second angle between the second housing part and the third housing part, at least one processor comprising processing circuitry, and memory, comprising one or more storage media, storing instructions. The instructions, when executed by at least one processor individually or collectively, cause the foldable electronic device to: display, in response to detecting changing from a multi-folded state to a single-folded state, on the first display area, one or more visual objects respectively corresponding to one or more software applications to be executed in an unfolded state. The instructions, when executed by at least one processor individually or collectively, cause the foldable electronic device to receive, while displaying the one or more visual objects on the first display area, an input to select at least one visual object among the one or more visual objects. The instructions, when executed by at least one processor individually or collectively, cause the foldable electronic device to display, based on the received input, on the first, the second, or the third display area, at least one execution screen corresponding to the at least one visual object selected by the input when a state of the foldable electronic device being changed from the single-folded state to the unfolded state.

For example, the instructions, when executed by at least one processor individually or collectively, cause the foldable electronic device to: identify, based on the first angle and the second angle indicated by sensor data from the at least one sensor, whether the state of the foldable electronic device correspond to one of specified states. The specified states may include the multi-folded state in which the second display area is covered by the third display area and the first display area face a rear side of the third housing part. The specified states may include the single-folded state in which the second display area is covered by the third display area and the first display area is in a same horizontal plane with the second display area. The specified states may include the unfolded state in which the first display area, the second display area, and the third display area are in a same horizontal plane.

For example, the instructions, when executed by at least one processor individually or collectively, cause the foldable electronic device to: display, on the first display area, the one or more visual objects corresponding to other inputs, received before the changing, indicating to execute the one or more software applications in the unfolded state.

For example, the instructions, when executed by at least one processor individually or collectively, cause the foldable electronic device to: receive inputs indicating to reserve one or more execution screens respectively corresponding to the one or more software applications for a list including the one or more visual objects.

For example, the instructions, when executed by at least one processor individually or collectively, cause the foldable electronic device to store, in response to inputs, in a queue arranged in the memory, one or more uniform resource indicators (URIs) respectively linked to the one or more software applications.

For example, the foldable electronic device may comprise a cover display disposed on a first side of the housing that is opposed to a second side of the housing on which the flexible display is disposed. The instructions, when executed by at least one processor individually or collectively, cause the foldable electronic device to display, on a fourth display area of the cover display, a first execution screen when the state of the foldable electronic device is in the multi-folded state. The instructions, when executed by at least one processor individually or collectively, cause the foldable electronic device to detect the changing from the multi-folded state to the single-folded state while displaying the first execution screen. The instructions, when executed by at least one processor individually or collectively, cause the foldable electronic device to display, in response to detecting changing from the single-folded state to the unfolded state without receiving the input, on the first, the second, and the third display areas, a second execution screen that is associated with the first execution screen.

For example, the instructions, when executed by at least one processor individually or collectively, cause the foldable electronic device to display the second execution screen to display, through the flexible display, a content which was displayed through the cover display.

For example, the instructions, when executed by at least one processor individually or collectively, cause the foldable electronic device to display, in response to detecting the changing from the multi-folded state to the single-folded state, the one or more visual objects based on a first list including the one or more software applications. The instructions, when executed by at least one processor individually or collectively, cause the foldable electronic device to display, in response to detecting changing from the unfolded state to the single-folded state, on the first display area, other visual objects based on a second list including other software applications. The other visual objects may respectively correspond to the other software applications.

For example, the instructions, when executed by at least one processor individually or collectively, cause the foldable electronic device to receive, while displaying the other visual objects on the first display area, another input to select at least one visual object among the other visual objects. The instructions, when executed by at least one processor individually or collectively, cause the foldable electronic device to display, based on the received another input, on the fourth display area, an execution screen corresponding to a software application selected by the another input.

As described above, a method of a foldable electronic device according to an example embodiment may be provided. The foldable electronic device may comprise a housing including a first housing part, a second housing part rotatably coupled to the first housing part, and a third housing part rotatably coupled to the second housing part, a flexible display including a first display area disposed on the first housing part, a second display area disposed on the second housing part, and a third display area disposed on the third housing part, at least one sensor configured to sense an angle between the first housing part and the second housing part, and an angle between the second housing part and the third housing part. The method may comprise: displaying, in response to detecting changing, from a multi-folded state to a single-folded state, on the first display area, one or more visual objects respectively corresponding to one or more software applications to be executed in an unfolded state. The method may comprise receiving, while displaying the one or more visual objects on the first display area, an input to select at least one visual object among the one or more visual objects. The method may comprise displaying, based on the received input, on the first, the second, or the third display areas, at least one execution screen corresponding to the at least one visual object selected by the input based on a state of the foldable electronic device being changed from the single-folded state to the unfolded state.

For example, the method may comprise identifying, based on the first angle and the second angle indicated by sensor data from the at least one sensor, whether the state of the foldable electronic device correspond to one of specified states. The specified states may include the multi-folded state in which the second display area is covered by the third display area and the first display area face a rear side of the third housing part. The specified states may include the single-folded state in which the second display area is covered by the third display area and the first display area is in a same horizontal plane with the second display area. The specified states may include the unfolded state in which the first display area, the second display area, and the third display area are in a same horizontal plane.

For example, the displaying the one or more visual objects may comprise displaying, on the first display area, one or more visual objects corresponding to other inputs, received before the changing, indicating to execute the one or more software applications in the unfolded state.

For example, the method may comprise receiving the other inputs indicating to reserve one or more execution screens respectively corresponding to the one or more software applications for a list including the one or more visual objects.

For example, the method may comprise storing, in response to the other inputs, in a queue arranged in the memory, one or more uniform resource indicators (URIs) respectively corresponding to the one or more software applications.

For example, the method may comprise displaying, on a fourth display area of a cover display disposed on a first side of the housing that is opposed to a second side of the housing on which the flexible display is disposed, a first execution screen when the state of the foldable electronic device is in the multi-folded state. The method may comprise detecting the changing from the multi-folded state to the single-folded state while displaying the first execution screen. The method may comprise displaying, in response to detecting changing from the single-folded state to the unfolded state without receiving the input, on the first, the second, and the third display areas, a second execution screen that is associated with the first execution screen.

For example, the displaying the second execution screen may comprise displaying the second execution screen to display, through the flexible display, a content which was displayed through the cover display.

For example, the displaying the one or more visual objects may comprise displaying, in response to detecting the changing from the multi-folded state to the single-folded state, the one or more visual objects based on a first list including the one or more software applications. The method may comprise displaying, in response to detecting changing from the unfolded state to the single-folded state, on the first display area, other visual objects based on a second list including other software applications, wherein the other visual objects are respectively corresponding to the other software applications.

For example, the method may comprise, receiving, while displaying the other visual objects on the first display area, receiving another input to select at least one visual object among the other visual objects. The method may comprise displaying, based on the received another input, on the fourth display area, an execution screen corresponding to a software application selected by the another input.

As described above, a non-transitory computer-readable storage medium storing instructions may be provided. The instructions may be executed by at least one processor, comprising processing circuitry, individually and/or collectively, of a foldable electronic device comprising a housing including a first housing part, a second housing part rotatably coupled to the first housing part, and a third housing part rotatably coupled to the second housing part, a flexible display including a first display area disposed on the first housing part, a second display area disposed on the second housing part, and a third display area disposed on the third housing part, at least one sensor configured to sense an angle between the first housing part and the second housing part, and an angle between the second housing part and the third housing part. The instructions may, when executed by the foldable electronic device, cause the foldable electronic device to display, in response to detecting changing, from a multi-folded state in which the second display area is covered by the third display area and the first display area face a rear side of the third housing part, to a single-folded state in which the second display area is covered by the third display area and the first display area is in a same horizontal plane with the second display area, on the first display area, one or more visual objects respectively corresponding to a first set of one or more software applications to be executed in an unfolded state in which the first, the second, and the third display areas are in a same horizontal plane. The instructions may, when executed by the foldable electronic device, cause the foldable electronic device to display, in response to detecting changing from the unfolded state to the single-folded state, on the first display area, other visual objects respectively corresponding to a second set of one or more software application to be executed in the multi-folded state.

For example, the instructions may, when executed by the foldable electronic device, cause the foldable electronic device to receive, while displaying the one or more visual objects on the first display area, an input to select at least one visual object among the one or more visual objects. The instructions may, when executed by the foldable electronic device, cause the foldable electronic device to display, based on the received input, on the first, the second, and the third display areas, at least one execution screen corresponding to the at least one visual object selected by the user input when a state of the housing being changed from the single-folded state to the unfolded state.

For example, the instructions may, when executed by the foldable electronic device, cause the foldable electronic device to receive, while displaying the other visual objects on the first display area, an input to select at least one visual object among the other visual objects. The instructions may, when executed by the foldable electronic device, cause the foldable electronic device to display, based on the received input, on a fourth display area of a cover display disposed on a first side of the housing that is opposed to a second side of the housing on which the flexible display is disposed, at least one execution screen corresponding to the at least one visual object selected by the input when a state of the housing being changed from the single-folded state to the multi-folded state.

For example, the instructions may, when executed by the foldable electronic device, cause the foldable electronic device to display a first execution screen on the first, the second, and the third display areas before the changing from the unfolded state to the single-folded state. The instructions may, when executed by the foldable electronic device, cause the foldable electronic device to display, in response to detecting changing from the single-folded state to the multi-folded state without receiving the input, on the fourth display area, a second execution screen that is associated with the first execution screen.

The device described above may be implemented as a hardware component, a software component, and/or a combination of a hardware component and a software component. For example, the devices and components described in various embodiments may be implemented using one or more general purpose computers or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. The processing device may perform an operating system (OS) and one or more software applications executed on the operating system. In addition, the processing device may access, store, manipulate, process, and generate data in response to the execution of the software. For convenience of understanding, there is a case that one processing device is described as being used, but a person who has ordinary knowledge in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more thereof, and may configure the processing device to operate as desired or may command the processing device independently or collectively. The software and/or data may be embodied in any type of machine, component, physical device, computer storage medium, or device, to be interpreted by the processing device or to provide commands or data to the processing device. The software may be distributed on network-connected computer systems and stored or executed in a distributed manner. The software and data may be stored in one or more computer-readable recording medium.

The method according to an example embodiment may be implemented in the form of a program command that may be performed through various computer means and recorded on a computer-readable medium. In this case, the medium may continuously store a program executable by the computer or may temporarily store the program for execution or download. In addition, the medium may be various recording means or storage means in the form of a single or a combination of several hardware, but is not limited to a medium directly connected to a certain computer system, and may exist distributed on the network. Examples of media may include may be those configured to store program instructions, including a magnetic medium such as a hard disk, floppy disk, and magnetic tape, optical recording medium such as a CD-ROM and DVD, magneto-optical medium, such as a floptical disk, and ROM, RAM, flash memory, and the like. In addition, examples of other media may include recording media or storage media managed by app stores that distribute applications, sites that supply or distribute various software, servers, and the like.

While the disclosure has been illustrated and described with reference to various example embodiments, it will be understood that the various example embodiments are intended to be illustrative, not limiting. It will be further understood by those skilled in the art that various changes in form and detail may be made without departing from full scope of the disclosure, including the appended claims and their equivalent. It will also be understood that any of the embodiment(s) described herein may be used in conjunction with any other embodiment(s) described herein.

No claim element is to be construed under the provisions of 35 U.S.C. § 112, sixth paragraph, unless the element is expressly recited using the phrase "means for" or "means."

What is claimed is:

1. A foldable electronic device comprising:

a housing including:

a first housing part;

a second housing part rotatably coupled to the first housing part; and a third housing part rotatably coupled to the second housing part, a first display including:

a first display area disposed on a front side of the first housing part;

a second display area disposed on a front side of the second housing part; and a third display area disposed on a front side of the third housing part, a second display including a fourth display area and disposed on a rear side of the first housing part or the second housing part, at least one sensor configured to detect a first angle between the first housing part and the second housing part, and a second angle between the second housing part and the third housing part;

at least one processor comprising processing circuitry; and memory, comprising one or more storage media, storing instructions, wherein the instructions, when executed by at least one processor, individually or collectively, cause the foldable electronic device to:

detect a state of the foldable electronic device via the at least one sensor, wherein the state of the foldable electronic device includes;

a fully-folded state in which the first and third housing parts are overlappingly folded with respect to the second housing part, a partially-folded state in which the first housing part of the third housing part is unfolded with respect to the second housing part and the first housing part or the third housing part is folded with respect to the second housing part, and an unfolded state in which the first and third housing parts are unfolded with respect to the second housing part, in response to identifying, via the at least one sensor, that a state of the foldable electronic device is changed from the fully-folded state to the partially-folded state, display, via the third display area, at least one user-selectable item corresponding to at least one application program;

receive an user input for selecting an item via the third display area from among the at east one user-selectable item;

in response to the user input, determine a first application program corresponding to the selected item as an application to be executed when a state of the foldable electronic device is changed to an unfolded state; and in response to identifying, via the at least one sensor, that a state of the foldable electronic device is changed from the partially-folded state to the unfolded state, display, by executing the first application program, a screen via the first, second, and third display areas from among the first, second, third, and fourth display areas.

2. The foldable electronic device of claim 1, wherein the instructions, when executed by at least one processor, individually or collectively, cause the foldable electronic device to:

based on the first angle and the second angle indicated by sensor data from the at least one sensor, identify whether the state of the foldable electronic device corresponds to one of specified states, wherein the specified states include:

the fully folded state in which the second display area is covered by the third display area and the first display area face a rear side of the third housing part;

the partially folded state in which the second display area is covered by the third display area and the first display area is in a same horizontal plane with the second display area; and the unfolded state in which the first display area, the second display area, and the third display area are in a same horizontal plane.

3. The foldable electronic device of claim 1, wherein the instructions, when executed by at least one processor, individually or collectively, cause the foldable electronic device to:

while the state of the foldable electronic device is in the fully-folded state, receive another user input for registering the at least one application program into a list; and based on the another user input, register the at least one application program to be included in the list, wherein the list is used to display the at least one user-selectable item while the state of the foldable electronic device is in the partially-folded.

4. The foldable electronic device of claim 3, wherein the instructions, when executed by at least one processor, individually or collectively, cause the foldable electronic device to:

display a plurality of user-selectable items based on identifying that the list includes a plurality of application programs respectively registered by user inputs received while the state of the foldable electronic device is in the fully-folded state.

5. The foldable electronic device of claim 3, wherein the instructions, when executed by at least one processor, individually or collectively, cause the foldable electronic device to:

in response to the another input, store, in a queue arranged in the memory, at least one uniform resource indicator (URI) linked to the at least one application program.

6. The foldable electronic device of claim 1, wherein the instructions, when executed by at least one processor, individually or collectively, cause the foldable electronic device to:

display, while the state of the foldable electronic device is in the partially-folded state display a first screen via the fourth display area of the second display; and in response to identifying, via the at least one sensor, that the state of the foldable electronic device is changed from the partially-folded state to the partially folded state and from the partially-folded state to the unfolded state without receiving the user input in the partially-folded state, display, on the first, the second, and the third display areas, a second screen that is associated with the first screen.

7. The foldable electronic device of claim 6, wherein the instructions, when executed by at least one processor, individually or collectively, cause the foldable electronic device to:

display the second screen to display, through the first display, a content which was displayed through the second display.

8. The foldable electronic device of claim 6, wherein the instructions, when executed by at least one processor, individually or collectively, cause the foldable electronic device to:

in response to detecting the changing from the fully-folded state to the partially folded state, display items included in a list corresponding to application programs; and in response to detecting changing from the unfolded state to the partially-folded state, display, on the first display area, other items included in another list corresponding to application programs independently determined with respect to the list.

9. The foldable electronic device of claim 8, wherein the instructions, when executed by at least one processor, individually or collectively, cause the foldable electronic device to:

while displaying the items on the first display area, receive another input to select at least one item among the other items; and based on the received another input, display, on the fourth display area, an execution screen corresponding to an application selected by the another input.

10. A method of a foldable electronic device comprising a housing including a first housing part, a second housing part rotatably coupled to the first housing part, and a third housing part rotatably coupled to the second housing part, a first display including a first display area disposed on a front side of the first housing part, a second display area disposed on a front side of the second housing part, and a third display area disposed on a front side of the third housing part, a second display including a fourth display area and disposed on a rear side of the first housing part of the second housing part, and at least one sensor configured to detect a first angle between the first housing part and the second housing part, and a second angle between the second housing part and the third housing part, the method comprising:

detecting a state of the foldable electronic device via the at least one sensor, wherein the state of the foldable electronic device includes;

a fully-folded state in which the first and third housing parts are overlappingly folded with respect to the second housing part, a partially-folded state in which the first housing part of the third housing part is unfolded with respect to the second housing part and the first housing part of the third housing part is folded with respect to the second housing part, and an unfolded state in which the first and third housing parts are unfolded with respect to the second housing part, in response to identifying, via the at least one sensor, that a state of the foldable electronic device is changed from the fully-folded state to the partially folded state, displaying, via the third display area, at least one user-selectable item corresponding to at least one application program;

receiving an user input for selecting an item via the third display area from among the at least one user-selectable item;

in response to the user input, determining a first application program corresponding to the selected item as an application to be executed when a state of the foldable electronic device is changed to an unfolded state; and in response to identifying, via the at least one sensor, that a state of the foldable electronic device is changed from the partially-folded state to the unfolded state, displaying, by executing the first application program, a screen via the first, second, and third display areas from among the first, second, third, and fourth display areas.

11. The method of claim 10, further comprising:

based on the first angle and the second angle indicated by sensor data from the at least one sensor, identifying whether the state of the foldable electronic device correspond to one of specified states, wherein the specified states include:

the fully folded state in which the second display area is covered by the third display area and the first display area face a rear side of the third housing part;

the partially folded state in which the second display area is covered by the third display area and the first display area is in a same horizontal plane with the second display area; and the unfolded state in which the first display area, the second display area, and the third display area are in a same horizontal plane.

12. The method of claim 10, comprises:

while the state of the foldable electronic device is in the fully-folded state, receiving another user input for registering the at least one application program into a list; and based on the another user input, registering the at least one application program to be included in the list, wherein the list is used to display the at least one user-selectable item while the state of the foldable electronic device is in the partially-folded state.

13. The method of claim 12, comprising:

displaying a plurality of user-selectable items based on identifying that the list includes a plurality of application programs respectively registered by user inputs received while the state of the foldable electronic device is in the fully-folded state.

14. The method of claim 12, comprising:

in response to the another input, storing, in a queue arranged in the memory, at least one uniform resource indicator (URI) corresponding to the at least one application program.

15. The method of claim 10, further comprising:

displaying, while the state of the foldable electronic device is in the partially-folded state, display a first screen via the fourth display area of the second display; and in response to identifying, via the at least one sensor, that the state of the foldable electronic device is changed from the partially-folded state to the partially-folded state and from the partially-folded state to the unfolded state without receiving the user input in the partially-folded state, displaying, on the first, the second, and the third display areas, a second screen associated with the first screen.

16. The method of claim 15, wherein the displaying the second screen comprises:

displaying the second screen to display, through the first display, a content which was displayed through the second display.

17. The method of claim 15, wherein the displaying the at least one user-selectable item comprises:

in response to detecting the changing from the fully-folded state to the partially folded state, displaying items included in a list corresponding to application programs; and wherein the method comprises:

in response to detecting changing from the unfolded state to the partially-folded state, displaying, on the first display area, other items in another list corresponding to application programs independently determined with respect to the list.

18. The method of claim 17, further comprising:

while displaying the items on the first display area, receiving another input to select at least one item among the other items; and based on the received another input, displaying, on the fourth display area, an execution screen corresponding to an application selected by the another input.

19. A non-transitory computer-readable storage medium storing instructions, wherein the instructions, when executed by at least one processor, individually and/or collectively, of a foldable electronic device comprising a housing including a first housing part, a second housing part rotatably coupled to the first housing part, and a third housing part rotatably coupled to the second housing part, a first display including a first display area disposed on a front side of the first housing part, a second display area disposed on a front side of the second housing part, and a third display area disposed on a front side of the third housing part, a second display including a fourth display area and disposed on a rear side of the first housing part of the second housing part, and at least one sensor configured to detect an angle between the first housing part and the second housing part, and an angle between the second housing part and the third housing part, cause the foldable electronic device to:

in response to detecting changing, from a multi-folded state in which the second display area is covered by the third display area and the first display area face a rear side of the third housing part, to a single-folded state in which the second display area is covered by the third display area and the first display area is in a same horizontal plane with the second display area, display, on the first display area, one or more visual objects respectively corresponding to a first set of one or more software applications to be executed in an unfolded state in which the first, the second, and the third display areas are in a same horizontal plane; and in response to detecting changing from the unfolded state to the single-folded state, display, on the first display area, other visual objects respectively corresponding to a second set of one or more software applications to be executed in the multi-folded state.

20. The non-transitory computer-readable storage medium of claim 19, wherein the instructions, when executed by at least one processor, individually and/or collectively, of the foldable electronic device, cause the foldable electronic device to:

while displaying the one or more visual objects on the first display area, receive an input to select at least one visual object among foldable; and based on the received input, display, on the first, the second, and the third display areas, at least one execution screen corresponding to the at least one visual object selected by the input based on a state of the housing being changed from the single-folded state to the unfolded state.

* * * * *